(12) United States Patent
Roskind et al.

(10) Patent No.: US 7,667,871 B1
(45) Date of Patent: Feb. 23, 2010

(54) VISUAL CRYPTOGRAPHY AND VOTING TECHNOLOGY USING A PAIR OF ENHANCED CONTRAST GLYPHS IN OVERLAY

(76) Inventors: James A. Roskind, 920 Governors Bay Dr., Redwood City, CA (US) 94065; Aaron T. Emigh, 762 Judith Ct., Incline Village, NV (US) 89451

( * ) Notice: Subject to any disclaimer, the term of this patent is extended or adjusted under 35 U.S.C. 154(b) by 942 days.

(21) Appl. No.: 11/048,514

(22) Filed: Jan. 31, 2005

Related U.S. Application Data

(60) Provisional application No. 60/554,668, filed on Mar. 18, 2004, provisional application No. 60/580,270, filed on Jun. 16, 2004, provisional application No. 60/540,723, filed on Jan. 30, 2004.

(51) Int. Cl.
*G09G 5/00* (2006.01)
*G06K 17/00* (2006.01)
*G06K 19/06* (2006.01)
*G07C 13/00* (2006.01)

(52) U.S. Cl. .............. 358/1.9; 358/3.27; 358/3.28; 358/1.18; 235/51; 235/386; 235/487; 380/54

(58) Field of Classification Search ............ 358/1.9, 358/3.27, 3.28, 450, 1.18; 380/54; 283/5, 283/73, 17; 382/284, 317; 340/5.8, 5.86; 235/51, 386, 487
See application file for complete search history.

(56) References Cited

U.S. PATENT DOCUMENTS

| | | | | |
|---|---|---|---|---|
| 2,952,080 A * | 9/1960 | Avakian et al. | ............... | 380/54 |
| 4,682,954 A * | 7/1987 | Cook | ............... | 380/54 |
| 5,488,664 A * | 1/1996 | Shamir | ............... | 380/54 |
| 6,728,376 B1 * | 4/2004 | Dean et al. | ............... | 380/54 |
| 6,873,966 B2 | 3/2005 | Babbitt et al. | | |
| 7,210,617 B2 * | 5/2007 | Chaum | ............... | 235/51 |
| 2004/0046021 A1 | 3/2004 | Chung | | |
| 2007/0095909 A1 * | 5/2007 | Chaum | ............... | 235/386 |

FOREIGN PATENT DOCUMENTS

GB 2037668 A * 7/1980

OTHER PUBLICATIONS

Office Action mailed May 30, 2008 in U.S. Appl. No. 11/048,504 13 pages.
U.S. Appl. No. 11/048,504, filed Jan. 31, 2005, Roskind et al.

* cited by examiner

*Primary Examiner*—Scott A Rogers
(74) *Attorney, Agent, or Firm*—Mahamedi Paradice Kreisman LLP

(57) ABSTRACT

In some embodiments, techniques for voting and visual cryptography may include various enhancements.

9 Claims, 31 Drawing Sheets

VISUAL CRYPTOGRAPHY AND VOTING TECHNOLOGY USING A PAIR OF ENHANCED CONTRAST GLYPHS IN OVERLAY

CROSS REFERENCE TO OTHER APPLICATIONS

This application claims priority to U.S. Provisional Patent Application No. 60/540,723 entitled Trustably Private but Publicly Transparent Electronic Voting, filed Jan. 30, 2004, which is incorporated herein by reference for all purposes.

This application claims priority to U.S. Provisional Patent Application No. 60/554,668 entitled System Privacy and Security, filed Mar. 18, 2004, which is incorporated herein by reference for all purposes.

This application claims priority to U.S. Provisional Patent Application No. 60/580,270 entitled Enhanced Visual List Comparison, filed Jun. 16, 2004, which is incorporated herein by reference for all purposes.

FIELD OF THE INVENTION

The present invention relates generally to the area of security. More specifically, techniques for voting and visual cryptography are disclosed.

BACKGROUND OF THE INVENTION

Voting is used for a wide variety of applications, including political offices, corporate officers, and initiatives. Current voting technology does not provide adequate defenses against the manipulation of results, does not provide a voter-verifiable audit trail, suffers from poor quality in reconstructed ballot images, is susceptible to coercion, is vulnerable to malicious attacks and/or is cumbersome to use.

Accordingly, there is a need to improve the security and usability of voting.

Visual cryptography may be used to provide privacy. Existing visual cryptographic methods are difficult to align and construe, and provide poor grayscale rendering.

Accordingly, there is a need for improved visual cryptography.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
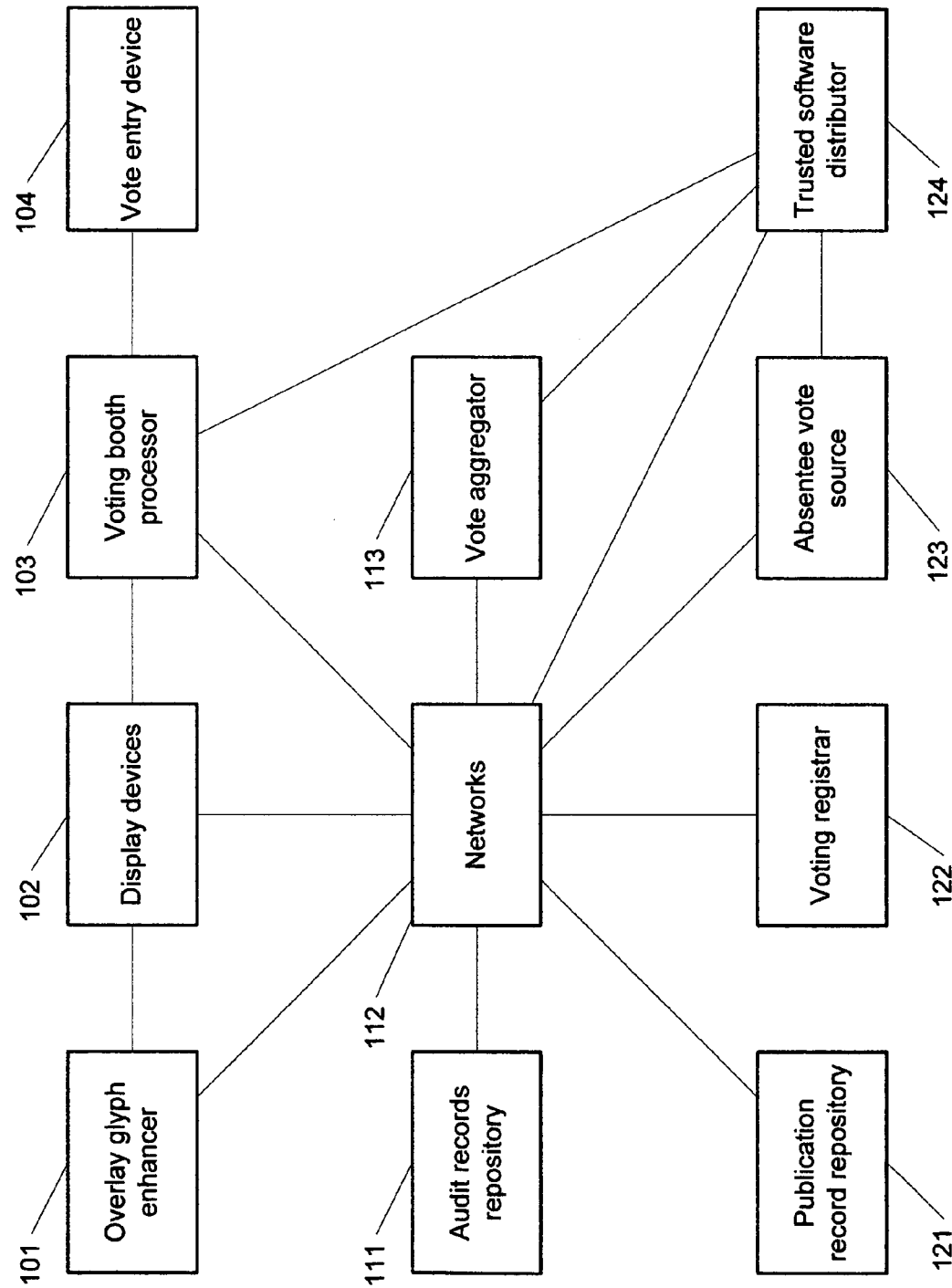
FIG. 1 is a diagram of a system for voting, according to some embodiments.

FIG. 1 is a diagram of a system for voting, according to some embodiments. In this example, a vote entry device 104 is connected to a voting booth processor 103. Examples of a vote entry device 104 include any mechanism that accepts a selection from a voter for a set of on or more ballot issues. Such a device may include a keyboard, touch screen, card reader, optical scanner, and pen tablet, as well as an electronic reader, including both optical and electronic memory readers, such as flash memory readers.

A voting booth processor 103 may include any system for translating and/or encrypting a vote in preparation for processing and eventual tallying. An example of a voting booth processor 103 includes a general purpose computer configured to process votes, and a tamper resistant embedded processor and memory dedicated to such tasks.

In this example, a voting booth processor is connected to one or more display devices 102. Examples of a display device include a printer, video display terminal, and LCD display terminal. In some embodiments, display devices 102 may be configured for performing overlay printing, for example printing on multiple sheets of paper and/or plastic for display with a backlight to facilitate reading of composite imagery.

In this example, display device(s) 102 are connected to an overlay glyph enhancer 101. A glyph enhancer 2201 may modify glyphs or resulting raster scan data prior to rendering, for example to enhance a resulting contrast ratio in an overlay display.

In this example, a voting booth processor 103, display devices 102, and overlay glyph enhancer 2201 are connected to a network 112. Examples of a network include an electronic communications network, such as a LAN or the Internet, and a physical media communications network, such as a postal service a courier service. Such a connection may facilitate software delivery to components, and/or facilitate transfer of information about a vote In this example, an audit records repository 111 is connected to one or more networks 112. Audit records may include electronic and/or physical records, such as paper records. For example, a voter verifiable audit trail may be stored in an audit records repository 111. In that example, a paper audit trail produced by display devices 102 may be delivered via a network 112 to an audit repository 111. As a second example, auditable proof that tallying was done correctly, such as intermediate electronic results in mix net processing performed by one or more trustees, may be stored in an audit records repository 111.

In this example, a vote aggregator 113 is connected to network(s) 112. A vote aggregator may include people and/or equipment, including data such as decryption keys, that may process and tally votes, including selection of valid and invalid votes. In some embodiments, a vote aggregator 113 may receive and authenticate absentee ballots in preparation for, or as part of, aggregation. In some embodiments, physical votes provided by a courier may be aggregated. In some embodiments, electronic voting records may be tallied by an aggregator. In some embodiments, aggregation such as tallying may be performed on other aggregations, such as tallies previously performed. In some embodiments, aggregators may construct audit trails for inclusion in an audit records repository 111 or a publications record repository 121, and/or extract information from a publication records repository 121 to assist in aggregation.

In this example, a publication record repository 121 is connected to the network(s) 112. Examples of publication records include electronic and physical records. In some embodiments, publication records may include private or public records used to authenticate and tally votes. For example, records may include encryptions of votes produced by a voting booth processor 103, intermediate aggregation results created and or used by a vote aggregator, and registration information or records constructed by a voting registrar 122.

In this example, a voting registrar 122 is connected to the network(s) 112. In some embodiments, a voting registrar 122 may validate identity credentials and/or facilitate construction of authorized voting credentials. Records of issued credentials may for example be recorded in publication or audit repositories 111 and 121, or in a separate data store such as a database or filing cabinet. In some embodiments, a voting registrar 122 may assist in validation of voting credentials, for example in support of a vote aggregator 113 authentication of acceptable votes. In some embodiments, a voting registrar 122 may assist in absentee ballot preparation, distribution, and authorization.

In this example, an absentee vote source 123 is connected to networks 112. An example an absentee vote source is voter that completed an absentee ballot for submission via a postal network. In some embodiments, an absentee vote source may be a personal computer and optional printer that conveys the intent of a voter. Such intent may be conveyed via electronic submission or by production of a printed or printable document. In some embodiments, trusted software may be used by an absentee vote source to reduce the potential for malicious software to corrupt a voter's intent. In some embodiments, trusted software may be obtained from a trusted software distributor 124. In some embodiments, an absentee vote source may provide an absentee vote through a physical medium, such as personal delivery or the US Postal Service.

In this example, a trusted software distributor 124 is connected to an absentee vote source 123, a voting booth processor 103, a vote aggregator 113, and network(s) 112. In some embodiments, a trusted software distributor may provide software across a trusted channel, including for example hand delivery, in a format that is less susceptible to preexisting malicious software, such as a virus, worm, or malicious configuration of a system. For example, a trusted software distributor may include an operating system in a distribution.

Figure 2:
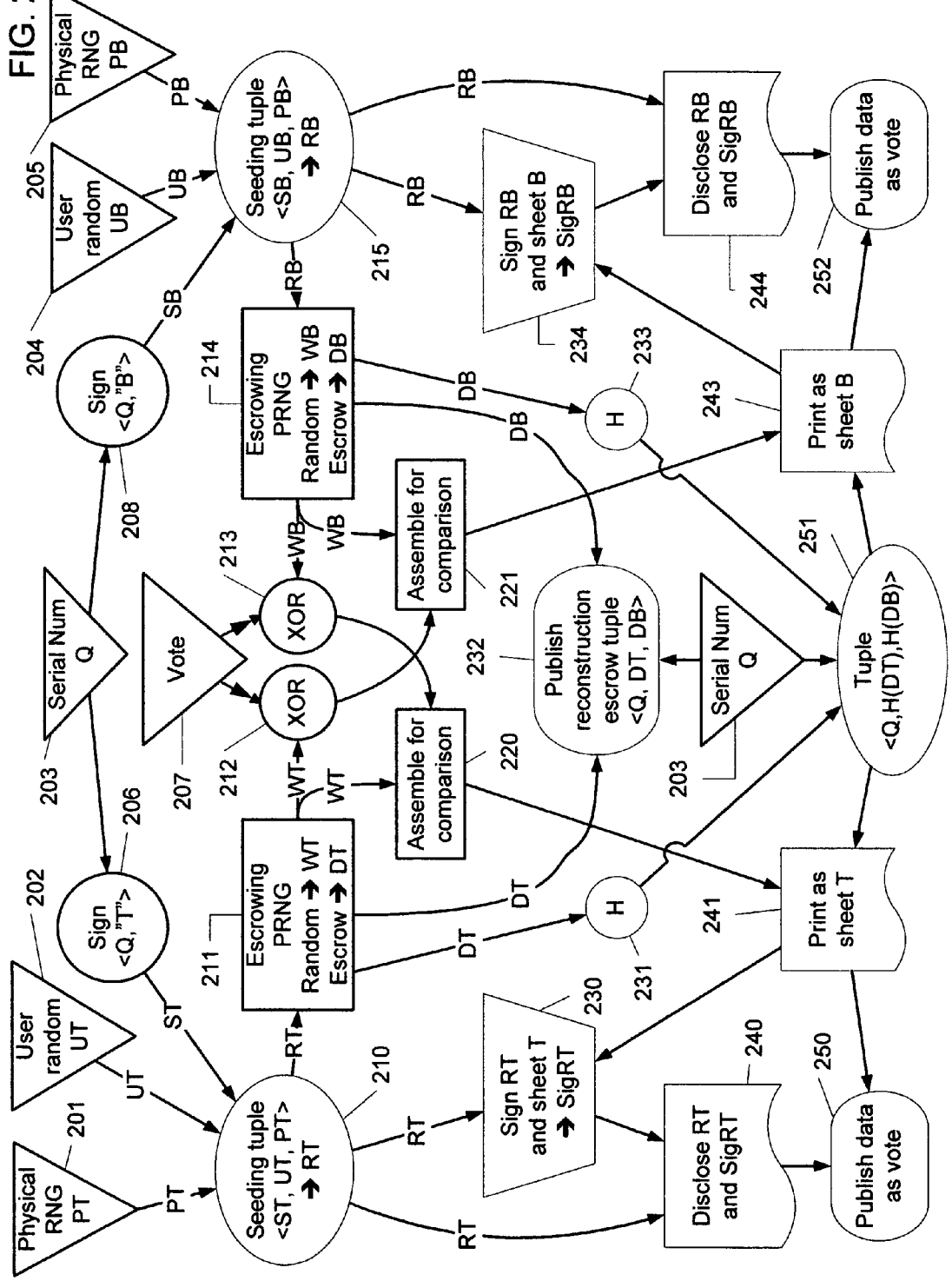
FIG. 2 is a data flow diagram of a system for voting, according to some embodiments.

FIG. 2 is a data flow diagram of a system for voting, according to some embodiments. In this example, a vote 207 is provided, for example in the form of a bit vector. In some embodiments, the vector may be ordered to match a list of one or more items that are being voted for/against, with one value, such as 1, indicating a vote for the item, and a different value, such has 0, indicating a vote against the item. For example, the list may consist of Gore and Bush, and a vote of (1, 0) would be a vote for Gore, a vote of (0, 1) would be a vote for Bush, and a vote of (0, 0) would be an abstention. In some embodiments, the bit vector may be a pixel array forming an image of a vote. For example, a bit map containing 1's and 0's to represent dark and light pixels may be used to define a raster image of a completed ballot. For example, a vote may consist of a 2-dimensional bit map for the rendering of the word "Gore," or the rendering of the word "Bush," or the rendering of a write-in candidate's name, as recorded by a scanner. In some embodiments, more than one ballot issue may be included in a vote. For example, a vote may include a voters selection for a president (a first ballot issue), and a voter's selection for a dog catcher (a second ballot issue). Each ballot issue may include one or more ballot items. For example, a presidential election ballot issue may consist of a collection of ballot items, such as nominated candidate names, initiatives and referenda.

In some embodiments, a vote may be combined via a bit-wise exclusive-OR (XOR) operation 212 with a pseudorandom bit vector WT generated by an escrowing pseudorandom number generator (PRNG) 211. An escrowing PRNG refers herein to a PRNG that generates a pseudorandom value and data, referred to herein as a reconstruction escrow, that may subsequently be used to regenerate the pseudorandom value. One example of an escrowing PRNG is a "doll" as discussed in David Chaum, "Secret-Ballot Receipts: True Voter-Verifiable Elections," IEEE Security & Privacy, January/February 2004, which is herein incorporated by reference for all purposes. Another example of an escrowing PRNG is discussed in conjunction with FIG. 3. An XOR operation refers herein to an operation that results in a value of 1 when source bits are different and a value of 0 when source bits are identical. Another copy of the vote may be combined via XOR 213 with another pseudorandom bit-vector WB generated by PRNG 214.

In some embodiments, the result of XORs 213, 212 may be assembled 220, 221 along with the pseudorandom bit vectors WT, WB. In some embodiments, the assembly may include constructing vectors of 2-bit numbers, formed by concatenating component bits of the result of the XOR with corresponding component bits of the pseudorandom vector. In some embodiments, the assembly 220 and 221 may be performed so that the most significant bits (MSB) of the concatenation depend on one PRNG output, and the least significant bits (LSB) of the concatenation depend on the other PRNG. For example, the MSB in both assemblies may depend on escrowing PRNG 211 by using the value of WT in assembly 220 as the MSB, and using the value of XOR 212 in assembly 221 as the MSB. In such an example, if an element in the vote bit-vector is 0, then the assemblies are identical for the corresponding elements in the assembled vectors 220 and 221. Similarly, in such an example, if an element of the vote bit-vector is 1, then the corresponding elements of the assembled vectors 220 and 221 are bitwise inverses of one and other.

The results of the assemblies 220 and 221 may be rendered in 241 and 243 respectively. For example, rendering may include printing or displaying to a user. The method of rendering may be selected to facilitate the comparison of the two outputs. For example, if a vote image was provided, then a set of glyphs appropriate for overlaying two printouts may be used, such as is discussed in conjunction with overlay glyphs in FIGS. 16 and 17. As a second example, if a vote vector corresponding to a list of items was provided, then XOR operations 212, 213 and assembly 220, 221 may be omitted, and a data representation appropriate to facilitating comparison of a list may be used, such as discussed in conjunction with FIG. 11. A user may compare the printed sheets produced by 241 and 243 to verify that the user's vote is accurately depicted in the difference between the outputs. In some embodiments, a comparison may be performed using visual decryption, in which differences in the printed sheets 241, 243 may be determined by overlaying the sheets so that the differences form an image, such as an image of the vote. In some embodiments, a comparison may be performed by aligning the printed sheets next to one another, and visually determining differences. For example, each sheet may contain a list of items, and portions of those lists may be manually compared.

A user may select which of the two outputs created by 241 or 243 to use as a recorded encrypted vote. If a user selects rendering T produced in 241, then in this example a pseudorandom seed RT and contents of sheet T are digitally signed in 230 as SigRT, that signature along with RT is disclosed in 240, and that disclosure along with the entire contents of sheet T is published and/or recorded as a certified vote in 250. An example of publishing a sheet T is to make an image of T available publicly, for example on a web site. An example of recording a sheet T is to retain a copy of T associated with a voting record, for example by storing an electronic and/or physical copy of T. If the user selects sheet B as printed in 243, then in this example corresponding signing 234, disclosure 244, and publication and/or recordation 252 are performed. Disclosure in 240 or 244 may be achieved by printing the data, for example as an additional printout on the associated sheet T or B provided in 241 and 243 respectively.

A reconstruction escrow for a pseudorandom number generator herein refers to encrypted information that may be used by trustees to reconstruct the pseudorandom output. Reconstruction escrows DT and DB produced in 211 and 214 respectively may also be published or recorded in 232, in conjunction with a serial number Q provided by 203.

Renderings T and B produced by 1141 and 243 may also include information derived from the serial number and reconstruction escrows DT and DB. In this example, cryptographic hashes of DT and DB are created by 231 and 233 respectively, and then combined with the serial number in 215 to form a tuple. Examples of cryptographic hashes include MD5 and SHA1. The rendering of the tuple on the printed sheets may use a machine readable font, such as a bar-code, or a human readable font, such as printed characters.

In some embodiments, seeds RT and RB used by the PRNGs 211 and 214 may be produced by combining entropy sources, such as the tuples constructed in 210 and 215 respectively. A physical RNG (Random Number Generator) may use relatively unpredictable physical phenomenon as a source of randomness, for example events relating to radioactive decay. Physical RNGs 201 and 205 may contribute randomness PT and PB to 210 and 215 respectively. A user may supply random values UT and UB in 202 and 204 respectively. Examples of such a random value include a text string entered by a user, and a user supplied value generated electronically or provided on media, such as a paper, solid state, or magnetic media, and read by 202 and 204 respectively. A serial number 203, such as a machine generated number unique to a vote, may be combined with a secret cryptographic signing key by signing the serial number in 206 and 208, producing pseudorandom values ST and SB respectively. In one example, the same signing key may be used in both 206 and 208, and different data may be signed, such as the tuple containing the serial number and "T" or "B" in the production of ST and SB respectively.

In some embodiments, the vote 207 may also be printed. A printed vote may be retained as a record of the vote. For example, a polling place may retain and store such printed records. Such a printout may also be used as a means of tallying votes, as an alternative to, or a statistical or deterministic means of verifying, tallying via decryption using the reconstruction escrow. In some embodiments, a third layer with a distinctive color, such as a red layer, may be printed as a background layer to a visual decryption and contain the plaintext of a vote image, and that third layer may be preserved as a voter verifiable audit trail. An example of a visual decryption is an overlay of sheets T and B as produced by 241 and 243 respectively.

In some embodiments, renderings T and B produced by 241 and 243 may also include machine readable redundancy data, such as an error correcting code. For example, in a printed rendering including a vote image encrypted using visual cryptography, a machine readable error correcting code may also be printed. Such an error correcting code may be used to facilitate scanning of a printed (encrypted) ballot, for example as part of a ballot validation. Examples of error correcting codes include parity codes, Hamming codes, and Reed-Solomon codes.

Figure 3:
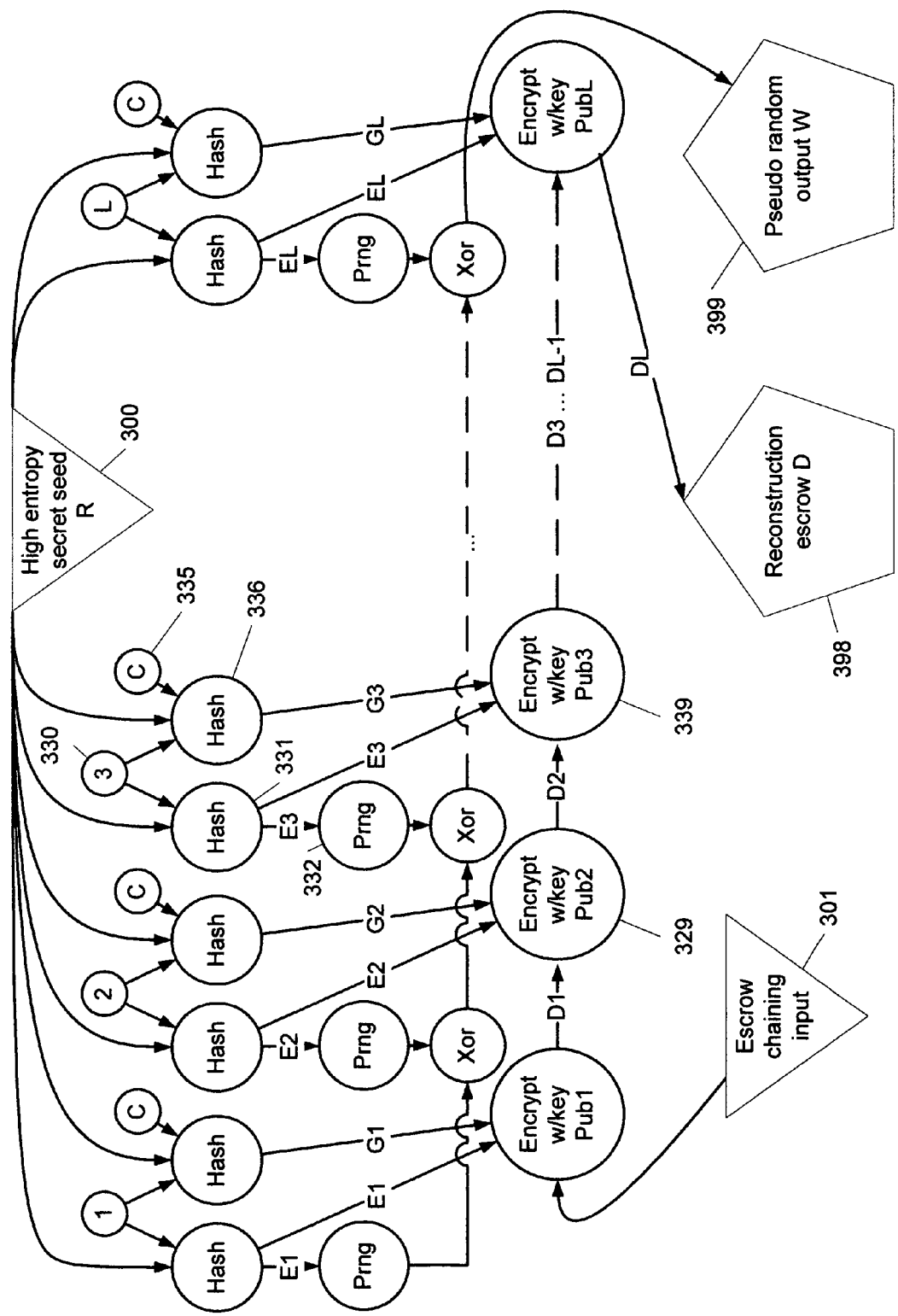
FIG. 3 is a data flow diagram of a system for generating a pseudorandom number and reconstruction escrow, according to some embodiments.

FIG. 3 is a data flow diagram of a system for generating a pseudorandom number and reconstruction escrow, according to some embodiments. In this example, a high entropy seed R is provided in 300 and a resulting k bit pseudorandom output W is generated in 398, along with a reconstruction escrow D in 399.

In this example, there are L stages of contribution to the generated outputs. For example, L may be 8. Each stage combines some information from a prior stage (if any) with data generated in that stage, and produces data for the next stage (or for the final output W and D). For example, in the third stage, the secret seed R from 300 is cryptographically hashed in 331 with a value 330 that is unique to this third stage. In this example, a value of 3 is used in the third stage and supplied by 330. Examples of a cryptographic hash include MD5 and SHA-1. The result of that third stage hash herein referred to as E3, the stage's seed, may used in the third stage's PRNG 332. One example of a stage's PRNG is an RC4 encryption of a stream of zeros, where the key for the encryption is the seed for the PRNG. Each stage's PRNG provides k bits, which are accumulated via XOR operations into the k bit output W in 399.

Each stage also encrypts via a public key the accumulated escrow from the previous stage (if any), along with the stage's internal values, to construct an escrow for use in the next stage (or as the final reconstruction escrow D). For example, in the third stage, the second stage escrow D2 produced in 329 is encrypted in 339. The encryption in this third stage uses a public key referred to herein as Pub3. The encrypted data may also include E3 (the stage's seed) and G3 from 331 and 336 respectively. The third stage value G3 may be computed in 336 by hashing a value provided in 330 that is unique to this third stage, along with a constant C provided by 335. In some embodiments, the second hash, such as G3 in the third stage, may not be included in the encrypted escrow, such as 339 in the third stage.

In some embodiments, an escrow from an external escrowing PRNG may be provided in 301. In some embodiments, no escrow chaining input is provided, and the first stage of an escrowing PRNG encrypts internal values for the first stage to provide an escrow to the next stage.

Figure 4:
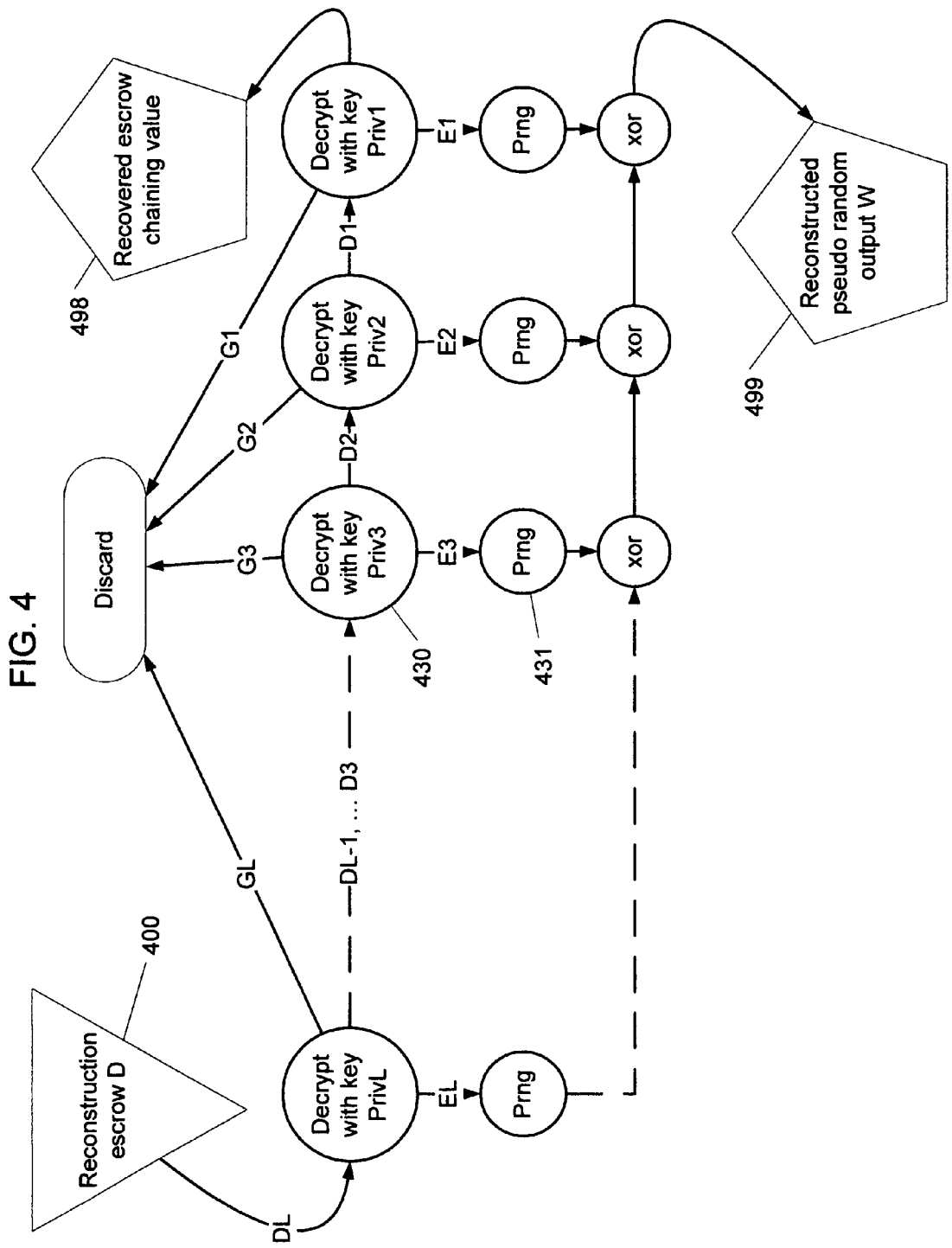
FIG. 4 is a data flow diagram of a system for reconstructing a number from a reconstruction escrow, according to some embodiments.

FIG. 4 is a data flow diagram of a system for reconstructing a number from a reconstruction escrow, according to some embodiments. In this example, a reconstruction escrow D provided in 400 is decrypted to reconstruct a value W in 499. In some embodiments, W may be a pseudorandom value that was originally generated in conjunction with the escrow, such as discussed in conjunction with FIG. 3.

A reconstruction may consist of L stages, corresponding to the number of stages in the escrow generation. For example, L may be 8. In each stage of the reconstruction an escrow from the previous stage (or the original escrow input) is decrypted, providing data for that stage, and optionally providing an escrow to be processed in the next stage. For example, in the third from the last stage of FIG. 4, escrow D3 is decrypted in 430 using private key Priv3. In this example, Priv3 is the corresponding private key for the public key Pub3 as discussed in conjunction with 339 of FIG. 3. The decryption may provide an escrow D2 for use in the second to the last stage, and may also provide E3 and G3 as were discussed in conjunction with FIG. 3. The value G3, if it exists, may be discarded in this example. The value E3, the stage's seed, may be used by a PRNG 431 to produce a k bit contribution (in this example via xor) to the complete k bit number W. If an escrow chaining input such as 301 of FIG. 3 was provided during the construction of the escrow D, then that escrow chaining value is recovered in 498 in this example.

Figure 5:
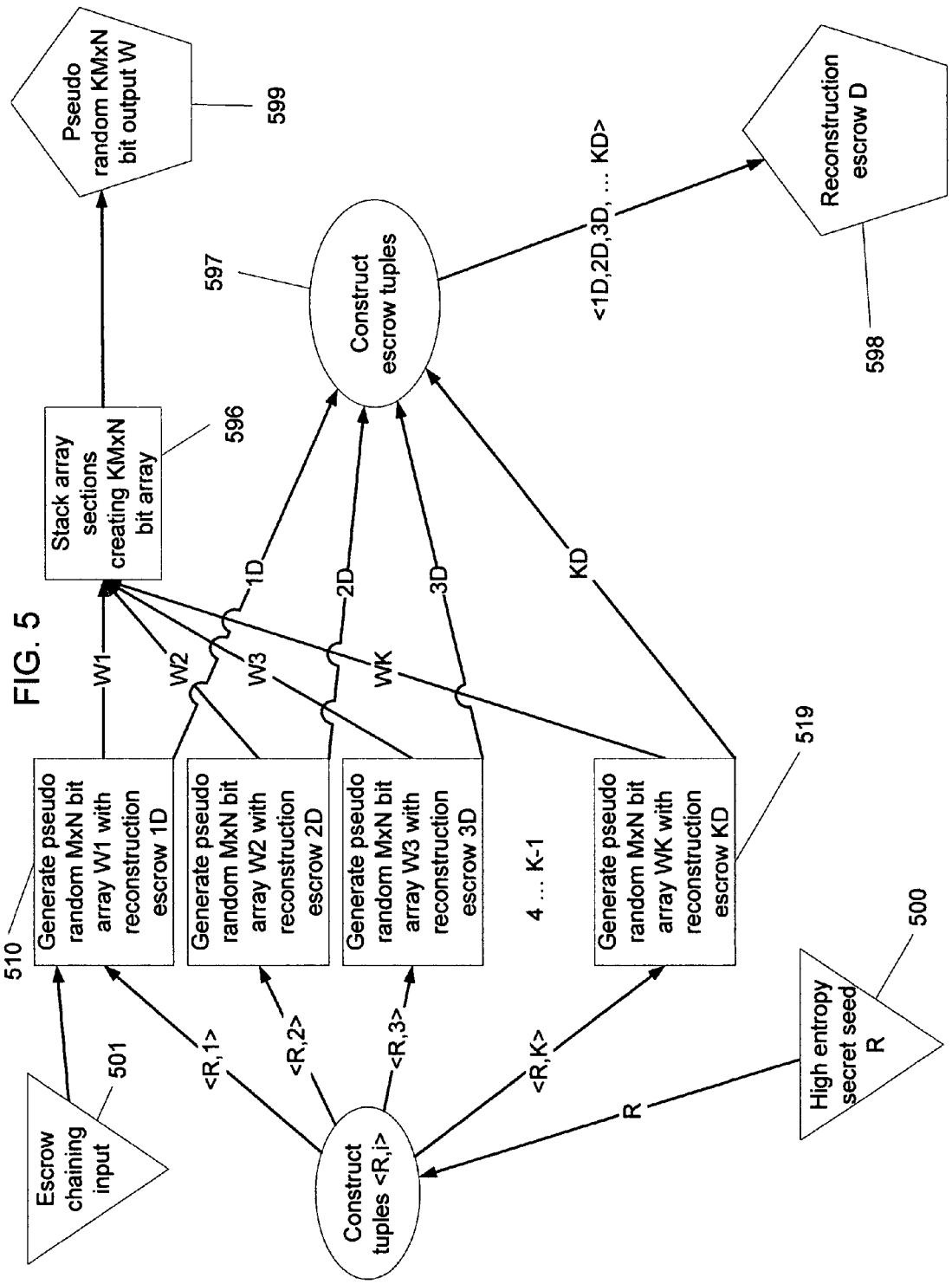
FIG. 5 is a data flow diagram for an escrowing PRNG that provides an integrated escrow for multiple PRNG contributors, according to some embodiments.

FIG. 5 is a data flow diagram for an escrowing PRNG that provides an integrated escrow for multiple PRNG contributors, according to some embodiments. In this example, a high entropy secret seed R 500 is used to generate a pseudorandom KM×N bit result, along with a reconstruction escrow D 598. An optional escrow chaining input 501 is also supported, as was discussed in conjunction with FIG. 3.

In a voting application such as discussed in conjunction with FIG. 2, when a vote consists of an image with K distinct ballot issues, then an individual M×N bit array may be used to encrypt each of the ballot issues. In a voting application such as discussed in conjunction with FIG. 2, when a vote consists of a list of M or fewer discrete options for each of the K ballot issues, then an M×1 generated list of bits may be used to encrypt a portion of the vote corresponding to each ballot issue.

Internal to this example PRNG are K separate escrowing PRNGs, each of which may generate an M×N bit pseudorandom array. Each component PRNG is seeded with a combination of a value dependent on the component number, and the secret seed R 500. For example, 519 is the $K^{th}$ PRNG, and it may use a secret seed consisting of the concatenation of R 500 with the number K. It produces an M×N bit pseudorandom number denoted WK, and an escrow denoted KD. The first PRNG 510 in this example may also accept an external optional escrow chaining input 501 (if any), and incorporate it into its resulting escrow output denoted 1D.

The K component M×N bit random numbers arrays, denoted W1 . . . WK, may be appended together in 596 to create a KM×N bit array. The resulting combined array may serve as the overall PRNG output W in 599.

The K component escrows, denoted 1D . . . KD, may be combined in 597 to create the overall escrow. For example, they may be listed as a K element tuple, and serve as the overall reconstruction escrow output 598.

In some embodiments, internal encryption keys may be different for escrow encryption contained in the K component PRNGs. Examples of encryption keys used in escrowing PRNGs include those discussed in conjunction with 339 of FIG. 3. In some embodiments, various trustees may possess corresponding private keys. In such examples, different trustees may be required to decrypt the escrows that are generated in various component PRNGs. In some embodiments, this separation allows an encrypted vote image to be broken into separate ballot issues before complete decipherment. The separate encrypted ballot issues may be deciphered in separate groups. In such an example, a vote on one ballot issue, decoded by one set of trustees, may not be immediately correlated with a vote cast by the same voter for a different ballot issue.

Figure 6:
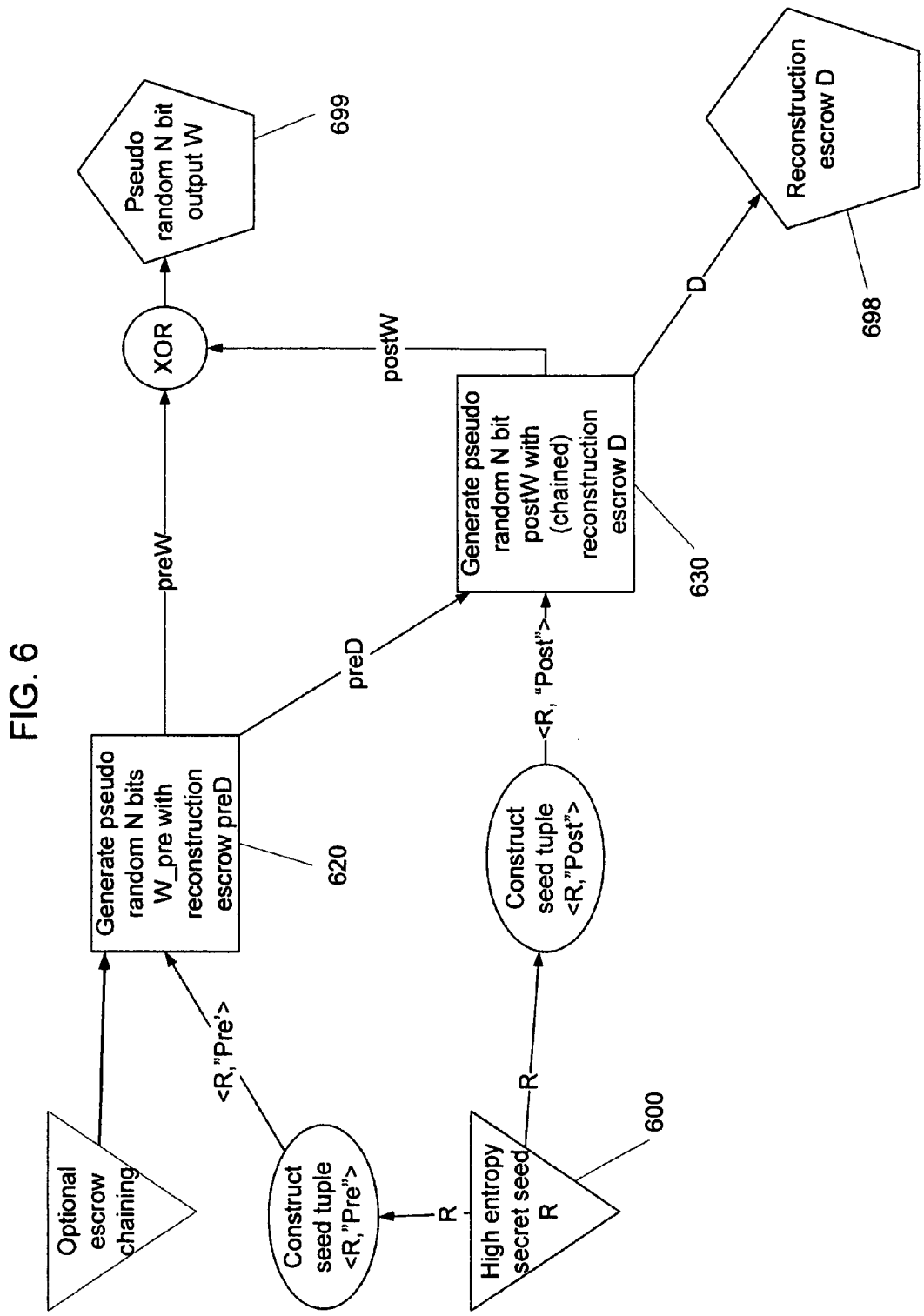
FIG. 6 is a data flow diagram for an escrowing PRNG that accumulates randomness from component escrowing PRNGs and nests their escrows, according to some embodiments.

FIG. 6 is a data flow diagram for an escrowing PRNG that accumulates randomness from component escrowing PRNGs and nests their escrows, according to some embodiments. In this example, N bits of randomness from escrowing PRNGs 630 and 620 are combined via an XOR operation to provide a final N bit output W 699. The escrow output from the escrowing PRNG 620 may be used as an escrow chaining input into PRNG 630, which in turn may produce a complete reconstruction escrow D 698.

In some embodiments, an escrowing PRNG 620 or 630 may be constructed as discussed in conjunction with FIG. 5 or 6.

The high entropy secret seed R 600 may provide entropy to one or both component PRNGs. The escrowing PRNGs 630 and 620 may use R in conjunction with another value, such as a constant, to create a unique entropy input. In this example, the tuple containing the word "Post" and the entropy R is provided to the escrowing PRNG 630, and the tuple containing the word "Pre" and the entropy R is provided to the escrowing PRNG 620.

Figure 7:
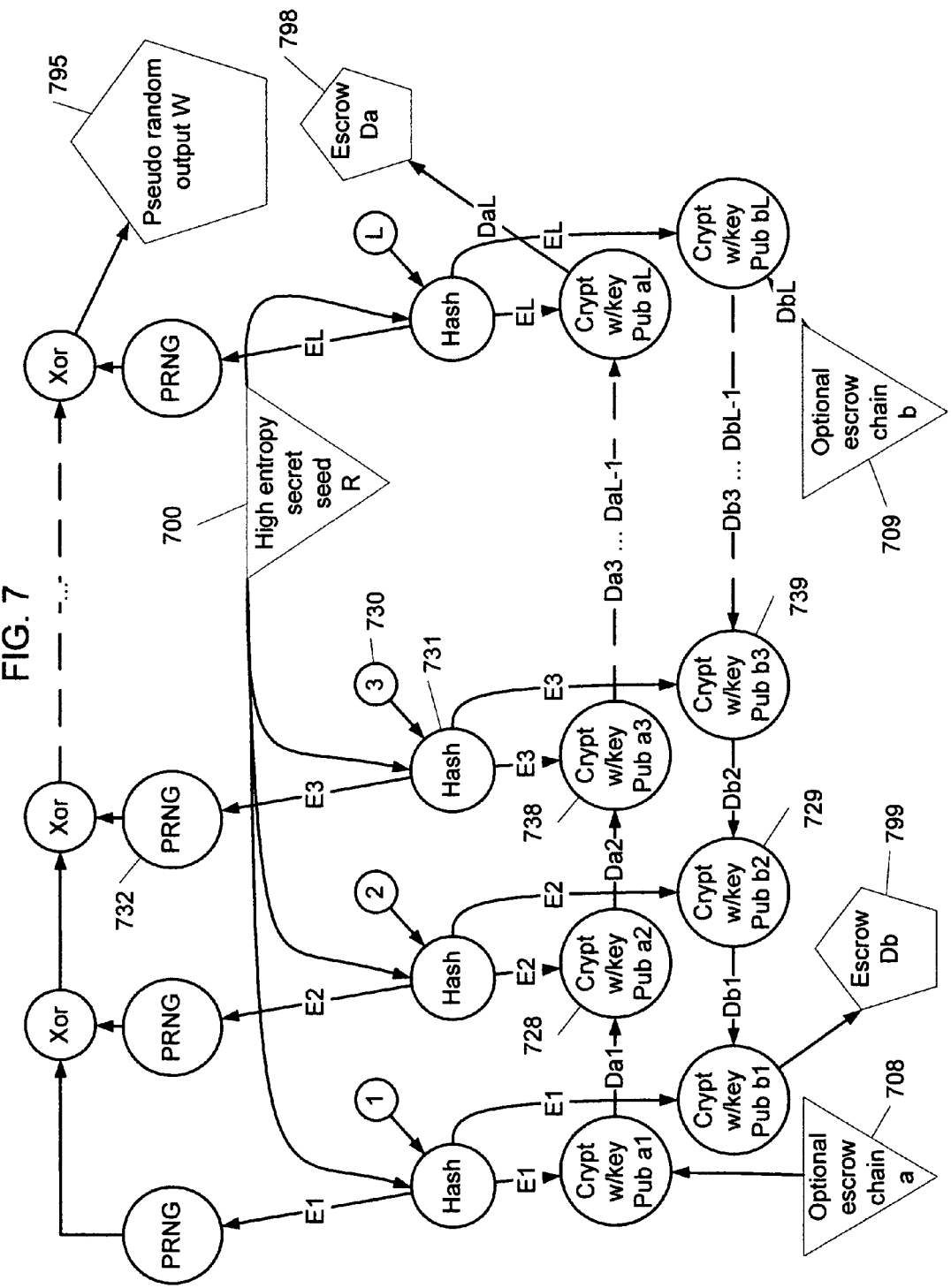
FIG. 7 is a data flow diagram for an escrowing PRNG with more than one independent escrow, according to some embodiments.

FIG. 7 is a data flow diagram for an escrowing PRNG with more than one independent escrow, according to some embodiments. In this example, two escrows Da and Db are created in 799 and 798 respectively. Each escrow may optionally have an escrow chaining input, such as 708 and 709.

In this example, the PRNG has L stages, and an individual stage may hash together a combination of an external high entropy secret seed R input in 700, and a value specific to the stage. For example, in the third stage, the constant 3 shown as 730 is hashed with R in 731 to construct a stage seed E3. One copy of that stage seed E3 is used as an input to a simple PRNG 732. An example of a simple PRNG is an RC4 cipher stream generator, using its input as a key, and configured to provide contributions via XOR to the final pseudorandom output W in 795.

An escrow chain may contain nested encryptions of all stage seeds. For example, in the third stage, the escrow chain that began with "optional escrow chain a" in 708 may encrypt in 738 using public key a3 a combination of the stage seed E3 from hash 731, along with encrypted results from the second stage provided by 728.

In some embodiments, additional stage secret information may be encrypted in each stage, such as the stage secret G3 data produced by 336 and discussed in conjunction with FIG. 3. In some embodiments, such additional data in a stage may be distinct for each escrow chain created, for example by using different constants such as 335 of FIG. 3 for each escrow construction, creating different contributions to the construction of Da vs. Db.

In some embodiments, one or more additional escrows may use a different nesting order, and/or encryption keys associated with different trustees, for encryption. In this example, a second escrow has an encryption nesting ordering for the escrow Db in 799 that is the exact opposite of the ordering for construction of Da in 798. For example, the third from the last encryption in the construction of Db may use public key b3 to encrypt E3 (and any nested encryptions) with the results contributed to 729 for encryption in the second to the last encryption in the formation of Db. In some embodiments, the nesting order may be a permutation of the ordering of another escrow's nesting order.

In some embodiments, private keys associated with different escrows may be known to various trustees. In some applications, these distinct trustees may be able to provide either backup decoding services for trustees in other chains, or may provide auditing capabilities to verify decoding done by other trustees. For example, in a voting application such as was discussed in conjunction with FIG. 2, additional escrows may be combined, for example by concatenation or placement into a tuple, to create a redundant escrow. In such a system, either escrow may be used to decipher a vote by extracting an individual escrow from a redundant escrow.

Figure 8:
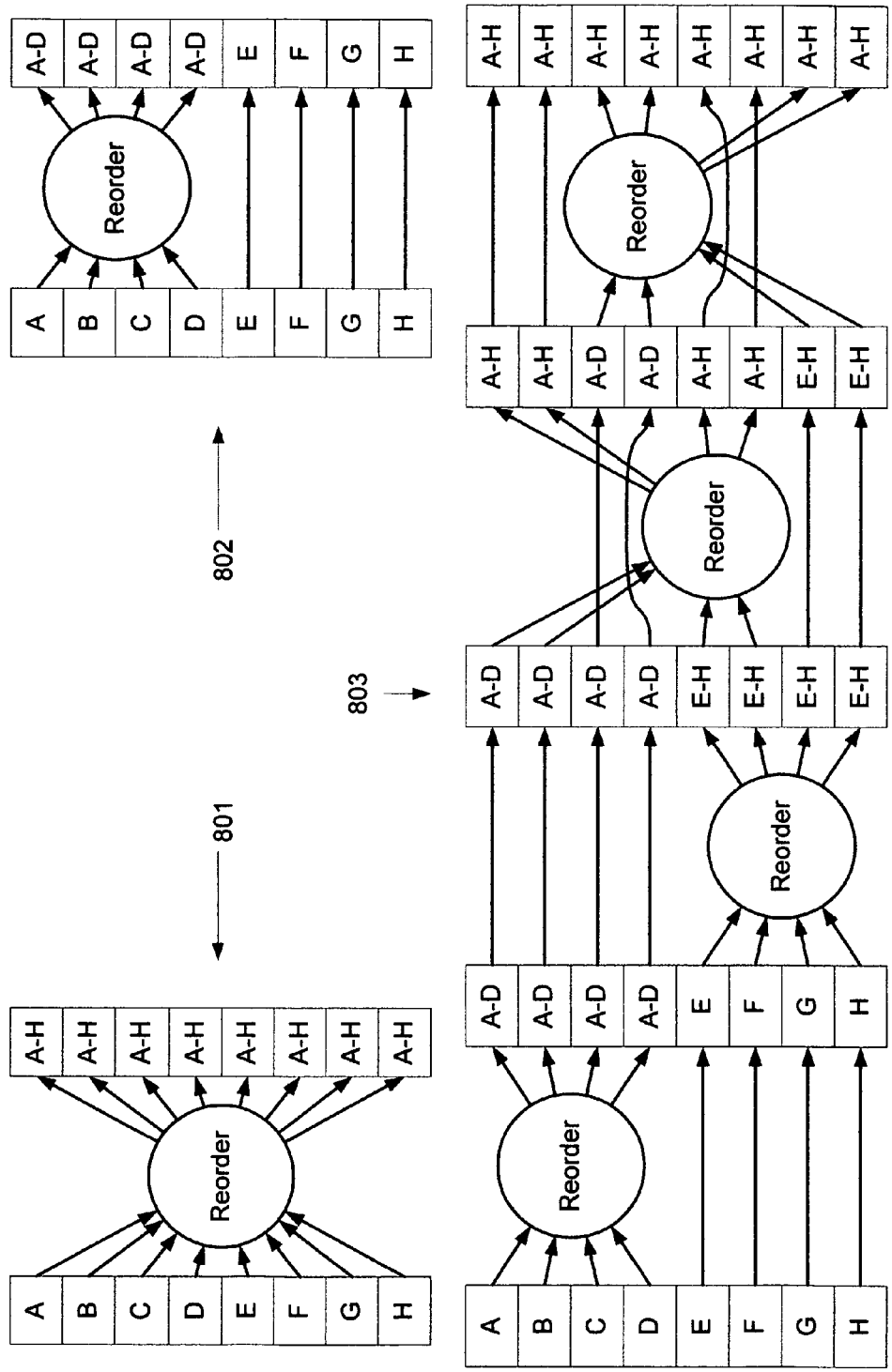
FIG. 8 is a diagram of mix net permutations with and without challenges, according to some embodiments.

FIG. 8 is a diagram of mix net permutations with and without challenges, according to some embodiments. A mix net refers herein to a system that accepts a list of encrypted inputs, and produces a corresponding list of decrypted or differently encrypted outputs, where only the entity that performs the processing is privy to exactly which input items are associated with which output items. In this example, 801 depicts the processing and mixing of list of 8 elements, identified with the letters "A" through "H", producing a list of 8 elements, labeled "A-H" to indicate the uncertainty to an external observer as to whether each element was associated with any one of the 8 specific input elements. In that example, after a complete input and output list is defined, an external observer may "challenge" the correctness of some members of the list (either input or output, or both). A challenge consists of identifying some subset of the list elements, in this case 50%, or 4 elements, and asking that the trustee prove that these elements were correctly translated. Such a proof may include, for each challenged element, identification of the corresponding elements in the input and output lists, and proving their correlation. For example, a proof of correlation may consist of revealing a secret which can be used to verify the correlation. An example of a secret that may be used to verify a correlation is one or more values that, when combined with an output and encrypted using a predetermined cryptographic key, yields a corresponding input.

The depiction 802 illustrates the result of such a partial challenge of 4 elements. For illustrative simplicity, the challenged inputs have been labeled "E" through "H," and the unchallenged inputs have been labeled "A" through "D." The illustrations shows that 4 of the outputs, labeled "E" through "H" are known to correlate to the identically named inputs, and 4 of the outputs labeled "A-D" are known only to correlate to the 4 unchallenged outputs.

In some embodiments, several mix nets with intermediate challenges may be sequentially composed to construct a mix net for which there is no externally visible correlation between the input list and output list. An example of this is the composition of 4 mix nets in 803, in which each intermediate mix net has 50% of its elements (in this example, 4 per round) challenged. To achieve this result, the challenges in the first round may be randomly chosen (and/or chosen by another trusted participant) and produce an intermediate list represented exactly as was the output list of 802. For the second round, challenges may be made for the elements that were not challenged the first round, and the intermediate list that results has half of its elements shown as "A-D" correlated to some unknown input between "A" and "D," while the other half are labeled "E-H" and correlated to some unknown input between "E" and "H." In the third round, half of the challenges may be taken from list elements challenged in the first round, labeled "A-D," and half may be taken from list elements challenged in the second round, labeled "E-H." The selection may be random, and/or done by another trusted participant. As a result, the unchallenged outputs from the third round are equally likely to correlate to "A-D" as to "E-H," and hence are labeled "A-H." The challenged elements output in the third round retain their uncertainty, and are labeled either "A-D" or "E-H" respectively. In the fourth round, challenges may be made to elements that were not challenged in the third round. As a result, the unchallenged elements of the fourth round are equally likely to be correlated to "A-D" as to "E-H," and hence all outputs from the fourth round are labeled "A-H."

For any integer P greater than 2, the above approach may be used when a challenge rate of P−1 out of P elements per round is employed (P was 2 in the above example), and a composition of at least 2×P rounds of mix nets are utilized. In various embodiments, P may be equal to 3, 4, 5, 6, 7, 8, 9 or 10. If the number of elements in the list to be processed is not a multiple of P×P, then additional list elements may be added to the list before processing, for example inconsequential elements. Examples of inconsequential elements in a mix net processing ballots include ballots with only abstentions, and ballots that are specially encoded to indicate that they are not actual votes. With a multiple of P×P list elements, and at least 2×P rounds of mix nets to challenge, the challenges may be made as follows. In each of the first P rounds, a set of 1/P of the list is unchallenged in that round. The selection may be made by establishing challenges for the first round, then second round, etc. The challenges may be selected in each round such that if an element is unchallenged in a round, then that element is challenged in all of the other rounds up to round P. Subject to the above constraint, selections may be made, randomly, pseudorandomly, or by a trusted party.

Starting with round P+1, and continuing to round 2×P, a different selection constraint may be used. In each successive round, the unchallenged set of list items may consist of 1/P of each of the list items challenged in each of the first P rounds. For example, 1/P of the items unchallenged in round 1, plus 1/P of the items unchallenged in round 2, . . . plus 1/P of the items unchallenged in round P, may be selected to be unchallenged in successive rounds. An additional constraint on the selection may be that any item that is unchallenged in these later rounds (P+1 . . . 2×P) is challenged in all subsequent rounds up to round 2×P.

Figure 9:
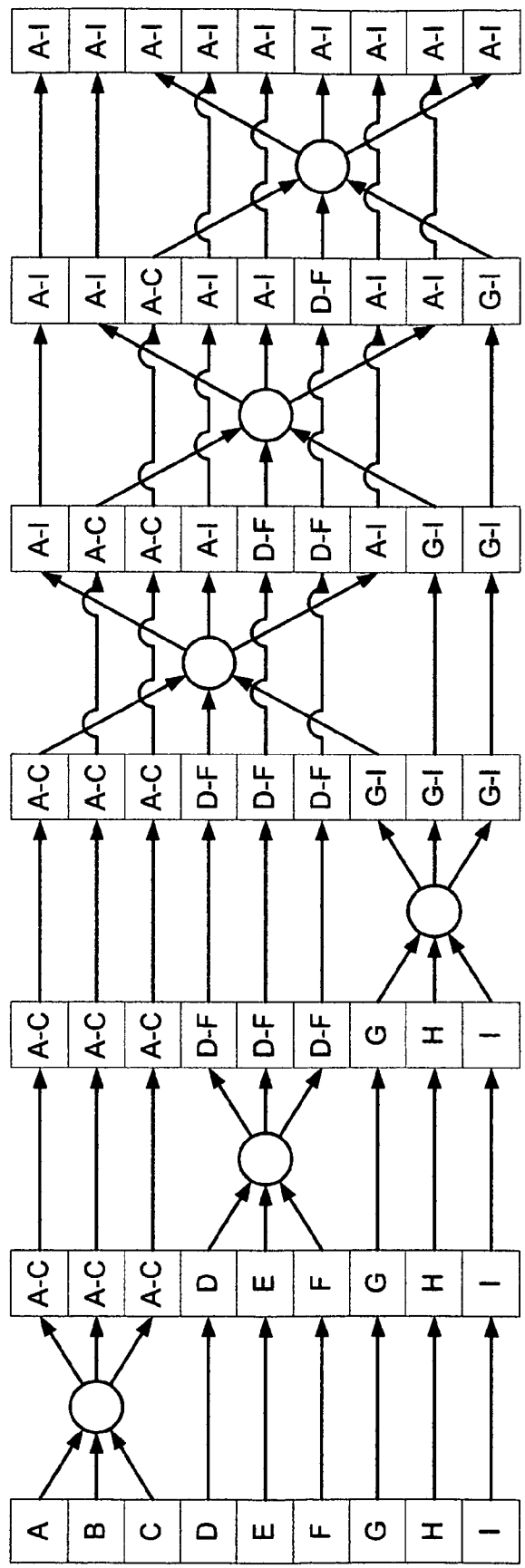
FIG. 9 is a diagram of the challenging of ⅔ of each round of a 6 round mix net, according to some embodiments.

FIG. 9 is a diagram of the challenging of ⅔ of each round of a 6 round mix net, according to some embodiments. In this example, the approach described in conjunction with FIG. 8 is used in which P is 3, the number of rounds 2×P==6, and the challenge rate is (P−1)/P==⅔ per round. For illustrative reasons, a total of 9 list elements is shown in this example, which is a multiple of P×P (3×3 ==9). As was depicted in FIG. 9, unchallenged items in a mix net are represented by a circle taking inputs on the left, and producing outputs on the right. The far left column has input elements labeled "A" through "I", and the final output has list elements labeled "A-I" to indicate that the correlation with the original list is unknown.

Figure 10:
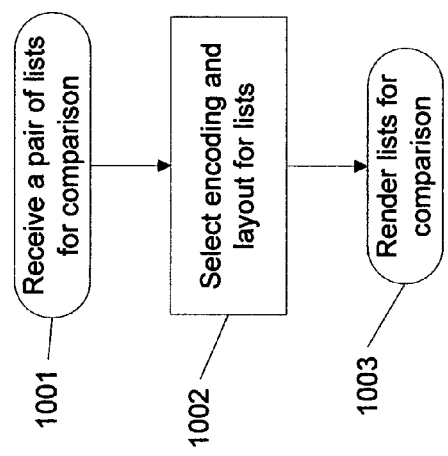
FIG. 10 is a flow diagram of a method for preparing and rendering a pair of lists for comparison, according to some embodiments.

FIG. 10 is a flow diagram of a method for preparing and rendering a pair of lists for comparison, according to some embodiments. In this example, a pair of lists is received (1001). A "list" refers herein to an ordered series of items. For example, the following is a list of 16 items, each of which is an integer in the range from 0 to 1: [0 0 0 1 1 1 0 0 1 0 1 0 1 1 0 1]. As a second example, the following is a list of 8 items, each of which is an integer in the range from 0 to 3: [0 1 3 0 2 2 3 1]. A third example is a list of 8 items, each of which is a tuple consisting of two binary digits: [(0 0) (0 1) (1 1) (0 0) (1 0) (1 0) (1 1) (0 1)].

An encoding and layout may be selected for the lists (1002). In some embodiments, lists of items may be laid out so that corresponding elements are adjacent to each other. For example, if lists of pairs of binary digits are laid out horizontally, then the following is an example of an element-by-element aligned list:

| (0 0) | (0 1) | (1 1) | (0 0) | (1 0) | (1 0) | (1 1) | (0 1) |
|-------|-------|-------|-------|-------|-------|-------|-------|
| (0 0) | (0 1) | (1 1) | (0 0) | (1 0) | (0 1) | (1 1) | (0 1) |

The following is an example of the same pair of lists, with the different element again in the sixth position, with a vertical layout.

| | |
|---|---|
| (0 0) | (0 0) |
| (0 1) | (0 1) |
| (1 1) | (1 1) |
| (0 0) | (0 0) |
| (1 0) | (1 0) |
| (1 0) | (0 1) |
| (1 1) | (1 1) |
| (0 1) | (0 1) |

In some embodiments, alignment may be horizontal. In some embodiments, alignment may be vertical. We refer herein to a visual comparison of lists using adjacent element placement as an "aligned comparison."

To illustrate colors in this document, which may be printed in black and white, uniform color regions will be surrounded in square brackets "[" and "]". The first or last character in each enclosed region will be used to denote the constant color used for the foreground characters in that region, such as "r" for red, "b" for blue, "g" for green, and "n" for normal black. For example, text of the form "[b 123] [456 g]" will be used to represent the text "123 456" with the first three character printed in blue, and the last three characters printed in green.

In some embodiments, the foreground and/or background color for elements in a list may be selected (1002) based on each element to facilitate an aligned comparison. For example, the following color map may be used to display elements that are associated with pairs of binary digits:

(0 0) displays as Red on a white background [(0 0) r]

(0 1) displays as Blue on a white background [(0 1) b]

(1 0) displays as Green on a white background [(1 0) g]

(1 1) displays as Normal (e.g. black) on a white background [(1 1) n]

In some embodiments, a character, word or glyph representing the color pattern may optionally be appended (or prepended) to the colorized region (or comparable region) as part of the encoding of the lists.

As an example, the above foreground coloring of binary pairs may be used in the initial example of an aligned comparison of two lists, producing the following:

| | |
|---|---|
| [(0 0) r] | [r (0 0)] |
| [(0 1) b] | [b (0 1)] |
| [(1 1) n] | [n (1 1)] |
| [(0 0) r] | [r (0 0)] |
| [(1 0) g] | [g (1 0)] |
| [(1 0) g] | [b (0 1)] |
| [(1 1) n] | [n (1 1)] |
| [(0 1) b] | [b (0 1)] |

In the above colored list example, the sixth element is identifiable by color as the point where the lists differ, and the fact that the other elements are identical may be visually verified by color as well.

In some embodiments, a more compact and visually discernable glyph may, as part of the encoding, replace a set of glyphs in a list rendered or displayed for an aligned comparison. For example, if the number of distinct elements subject to comparison, formed by combinations of glyphs, is small, then a small set of glyphs can be used in place of, or in addition to, each of the comparable elements. For example if elements to compare in a list are pairs of binary digits, then there are no more than four possible pairs, and a unique glyph may be used in place of each comparison element. In such an example, the display or rendering could be:

(0 0) displays as ↑
(0 1) displays as ←
(1 0) displays as →
(1 1) displays as ↓

For example, representing the previous example of an aligned list of 8 pairs of binary digits using only the above glyph, the aligned list comparison would look like:

↑↑
←←
↓↓
↑↑
→→

→←
↓↓
←←

In the above list, the sixth element is discernable as the point where the lists differ, and the fact that the other elements are identical is also verifiable.

In some embodiments, both a more compact glyph and a color mapping may be used as part of the encoding. For example, the original list could be presented for aligned comparison with pairs of binary digits in the following representation:

(0 0) displays as [↑r]
(0 1) displays as [←b]
(1 0) displays as [→g]
(1 1) displays as [↓n]

In some embodiments, as part of the encoding, a replacement glyph mapping may be chosen that evidences a relationship between differing elements in an aligned comparison. For example, in addition to distinguishing the differing element(s) in the original aligned comparison of pairs of binary digits, it may be useful to verify that the differences, if any, all satisfy some relationship, such as the inverting of binary digits. In such an example, it is necessary to verify for differing elements that pair (0 0) is only adjacent to pair (1 1), and pair (1 0) is only adjacent to pair (0 1). The above compact glyph example using horizontal and vertical arrows is an example of a glyph mapping that facilitates such comparison, as both (1 1) and (0 0) use vertical arrows, which match when pointing in the same direction, but demonstrate bit inversion when pointing in opposite directions. Similarly, the horizontal arrows represent the pairs (1 0) and (0 1), and indicate a perfect match when pointing in identical directions, and represent bit inversion when pointing in opposite directions. Any distinguishable glyphs that share some common readily apparent attribute, such as orientation (as demonstrated with the arrow glyphs), fill pattern, background or foreground color, shape or placement, may be used to verify a level of commonality in the corresponding differing elements.

In some embodiments, encoding may vary from list to list. In some embodiments, one glyph (or color) map may be used for rendering or displaying one list for an aligned comparison, while a different map may be used to render or display a second list. For example, the use of the arrow head glyphs could be modified so that the right hand list used glyph maps with arrow heads that have opposing direction (on a per element basis) to the glyph maps used for the left hand list. The resulting aligned comparison of the initial example of 8 pairs of binary digits would then appear in this example as:

↑↓
←→
↓↑
↑↓
→←
→→
↓↑
←→

In this example, if all differences between compared list items are known to satisfy an aforementioned relationship (for example a relationship wherein pairs of binary digits are inverted) then such a representation may highlight the differing sixth item. All "differing binary digit" items in that example appear with identical glyphs (or colors) in corresponding positions in this example.

In some embodiments, the list encoding and layout selected may be used to represent portions of a voting ballot that represents a vote as one or more similarities and/or differences between elements of two lists. For example, as discussed in conjunction with FIG. 2, when a vote supplied in 207 is an ordered list of 0's and 1s, corresponding to vote selections for an ordered list of candidates, then 220 and 221 assemble lists of pairs of bits for comparison. For example, in an election with eight candidates, a blank ballot, with no votes cast, based on a one seeded PRNG encryption, might be represented by the following pairs of binary digits:

| 1 | 2 | 3 | 4 | 5 | 6 | 7 | 8 |
|---|---|---|---|---|---|---|---|
| 0 0 | 0 1 | 1 1 | 0 0 | 1 0 | 1 1 | 1 1 | 0 1 |
| 0 0 | 0 1 | 1 1 | 0 0 | 1 0 | 1 1 | 1 1 | 0 1 |

With the same seeded PRNG encryption, if a single vote was registered, such as for the sixth candidate, the two lists to differ as shown:

| 1 | 2 | 3 | 4 | 5 | 6 | 7 | 8 |
|---|---|---|---|---|---|---|---|
| 0 0 | 0 1 | 1 1 | 0 0 | 1 0 | 1 0 | 1 1 | 0 1 |
| 0 0 | 0 1 | 1 1 | 0 0 | 1 0 | 0 1 | 1 1 | 0 1 |

A selected layout may include additional formatting and data. In some embodiments, the candidate names or descriptive text may be rendered or displayed on a ballot along with the actual vote, as encrypted into differences between two lists. For example, candidates corresponding to the eight candidates above may be named:

1. Goofy
2. Minnie
3. Mickey
4. Donald
5. Pluto
6. Huey
7. Dewey
8. Louie

The above ballot with a vote cast for Huey, the sixth element in the list, might be encoded as:

| | |
|---|---|
| Goofy (0 0) | (0 0) Goofy |
| Minnie (0 1) | (0 1) Minnie |
| Mickey (1 1) | (1 1) Mickey |
| Donald (0 0) | (0 0) Donald |
| Pluto (1 0) | (1 0) Pluto |
| Huey (1 0) | (0 1) Huey |
| Dewey (1 1) | (1 1) Dewey |
| Louie (0 1) | (0 1) Louie |

The two columns are examples of what may be rendered in 241 and 243 respectively, as discussed in conjunction with FIG. 2, when the vote 207 is a list of 1's and 0's for each of the 8 candidates.

A selected layout and encoding may include additional information, such as aggregate information about the list, or the meaning of the list, or additional reference or authentication information. In some embodiments, some or all information presented on the ballot list may be included in the hash or resulting signature for a printout. Examples of signatures on printed sheets include 230 and 234, as discussed in conjunction with FIG. 2. For example, the candidate names, as presented in the above list, may be included on the above sheets and signed as appropriate, or a hash of the name list may be included on the sheets and signed as appropriate, or the name list or its hash may be implicitly included on the sheets and signed as appropriate. As a second example, the definition of any glyph or color mapping may be implicitly included or printed and explicitly included in signatures created for the above sheets.

A selected encoding may include coloration that may be applied to some or all of a list item, and may be based upon data in that item. As an example the following color map may be used to render the completed (and encrypted) ballot described above:

(0 0) displays as Red on a white background [(0 0) r]
(0 1) displays as Blue on a white background [(0 1) b]
(1 0) displays as Green on a white background [(1 0) g]
(1 1) displays as Normal black on a white background [(1 1) n]

If the above coloring is applied to the entire line, the above ballot is encoded in this example as:

| | |
|---|---|
| [Goofy (0 0) r] | [r (0 0) Goofy] |
| [Minnie (0 1) b] | [b (0 1) Minnie] |
| [Mickey (1 1) n] | [n (1 1) Mickey] |
| [Donald (0 0) r] | [r (0 0) Donald] |
| [Pluto (1 0) g] | [g (1 0) Pluto] |
| [Huey (1 0) g] | [b (0 1) Huey] |
| [Dewey (1 1) n] | [n (1 1) Dewey] |
| [Louie (0 1) b] | [b (0 1) Louie] |

The above list highlights the fact that the vote is for the Huey by using different colors on the left vs. the right column for the cast vote. The explicit presence of the binary digits is optional in the above presentation, and it is implied by the color. For example, the lists could be encoded as:

| | |
|---|---|
| [Goofy r] | [r Goofy] |
| [Minnie b] | [b Minnie] |
| [Mickey n] | [n Mickey] |
| [Donald r] | [r Donald] |
| [Pluto g] | [g Pluto] |
| [Huey g] | [b Huey] |
| [Dewey n] | [n Dewey] |
| [Louie b] | [b Louie] |

In some embodiments, different color maps may be chosen for each side such that an encoded difference will show as the same color, while no difference will show as a different color. As an example, the above ballot may be encoded using the following color map only for the right hand column, while using the previous example color map again for the left hand column:

(0 0) displays in right column as Normal black on a white background [(0 0) n]
(0 1) displays in right column as Green on a white background [(0 1) g]
(1 0) displays in right column as Blue on a white background [(1 0) b]
(1 1) displays in right column as Red black on a white background [(1 1) n]

The completed ballot would then be encoded in this example as:

| | |
|---|---|
| [Goofy (0 0) r] | [n (0 0) Goofy] |
| [Minnie (0 1) b] | [g (0 1) Minnie] |
| [Mickey (1 1) n] | [r (1 1) Mickey] |
| [Donald (0 0) r] | [n (0 0) Donald] |
| [Pluto (1 0) g] | [b (1 0) Pluto] |
| [Huey (1 0) g] | [g (0 1) Huey] |
| [Dewey (1 1) n] | [r (1 1) Dewey] |
| [Louie (0 1) b] | [g (0 1) Louie] |

In the above example with the above set of left and right color mappings, the vote is indicated by a consistent color in the adjacent columns, as seen in the sixth entry, where green is uniformly used. The presence in the presentation of the actual binary digit pair or related glyph or representation is optional in the above example.

In the following example, the completed ballot from the previous examples is encoded using the compact arrow head glyph to represent the binary digit pairs, with the same glyph map used in both the left and right column:

| | | |
|---|---|---|
| Goofy | ↑ ↑ | Goofy |
| Minnie | ← ← | Minnie |
| Mickey | ↓ ↓ | Mickey |
| Donald | ↑ ↑ | Donald |
| Pluto | → → | Pluto |
| Huey | → ← | Huey |
| Dewey | ↓ ↓ | Dewey |
| Louie | ← ← | Louie |

In the above example, the differing arrows on the line with Huey identify the vote expressed in this ballot.

Lists may be rendered for comparison (1003). For example, they may be printed. Although the above examples were printed with elements next to corresponding elements in the second list, the lists may be printed separately and manually or automatically aligned for a visual comparison.

Figure 11:
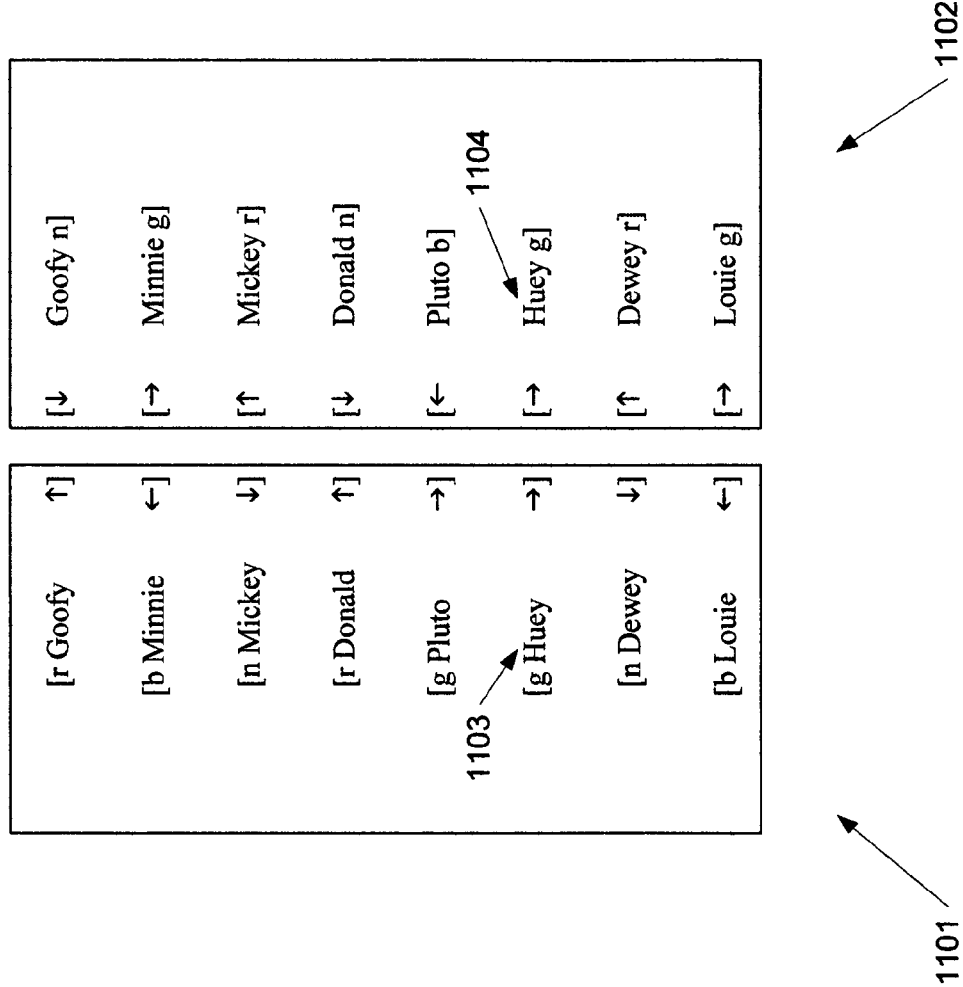
FIG. 11 is a diagram of an aligned comparison of two lists using both a glyph and a color to represent a vote, according to some embodiments.

FIG. 11 is diagram of an aligned comparison of two lists using both a glyph and a color to represent a vote, according to some embodiments. In this example, a color and a glyph are both used to represent each binary digit pair (shown in the previous completed ballot examples), and the left and right maps (for both glyphs and colors) were chosen as described earlier so that the vote in the ballot is apparent from matching glyphs, and matching colors. As noted earlier, the square brackets "[ ]" in the Figure are present only for illustrative purposes to designate the extent of color, and the color selection is provided by the letter "b," "r," "g" and "n" just inside such brackets. Printed blocks 1101 and 1102 are examples of portions of the printout that may be provided in 241 and 243 respectively, as discussed in conjunction with FIG. 2.

In this example, a vote for "Huey" is presented. The sixth entry in the left list 1101 with the candidate name "Huey" 1103 is colored green, and is associated with a right pointing arrow glyph. The sixth entry in the right hand list 1102 with the candidate name "Huey" 1104 also is colored green, and is associated with a right pointing arrow glyph. All other candidates have non-matching colors on the two lists, and also have non-matching directed arrow glyphs on the two lists.

In some embodiments, when the number of listed options to cast a vote for is small, for example less than 3 listed options total, one or more additional options may be listed to indicate alternatives, such as "abstain." For example, if a vote is for a referendum where the two possible votes are "vote for Yes" and "vote for No," a third listed entry of "abstain" may be provided.

Figure 12:
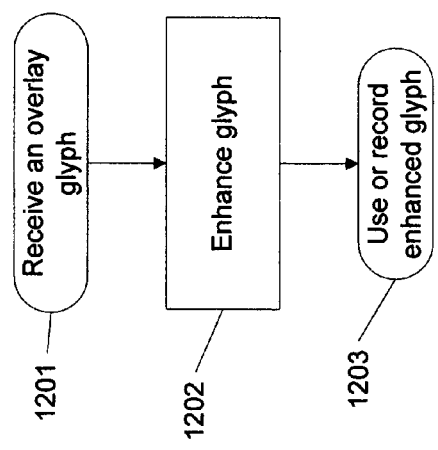
FIG. 12 is a flow diagram of a method for enhancing an overlay glyph, according to some embodiments.

FIG. 12 is a flow diagram of a method for enhancing an overlay glyph, according to some embodiments. In this example, an overlay glyph is received (1201). Examples of overlay glyphs include glyphs that may be printed, with various glyphs on various sheets. When such sheets are aligned a desired net transparency related to the layering alignment of the clear and opaque subregions of the glyphs may be produced.

A glyph may be enhanced (1202). Enhancement of a glyph may include increasing the extent of the opaque regions. For example, an overlay glyph which is 50% opaque, and 50% clear or transparent, may be augmented to have additional opaque area, and/or less clear area. In some embodiments, enhanced glyphs may be easier to align. In some embodiments, the overlay of enhanced glyphs may have less leakage of light near subregions where a transparent subregion rendered on one layer in one glyph is adjacent to a transparent subregion of another glyph rendered in another layer. In some embodiments, enhanced glyphs may produce a greater contrast ratio between overlays having a desired net transparency of zero, and other overlays which have some intended net transparency. Examples of enhanced glyphs are discussed in conjunction with FIG. 13.

An enhanced glyph may be used or recorded (1203). For example, an enhanced glyph may be printed in place of the original glyph. As another example, a glyph may be stored for future use, including repeated use. In some embodiments, a collection of glyphs may be processed in this manner, and the enhanced glyphs may be stored for future use.

Figure 13:
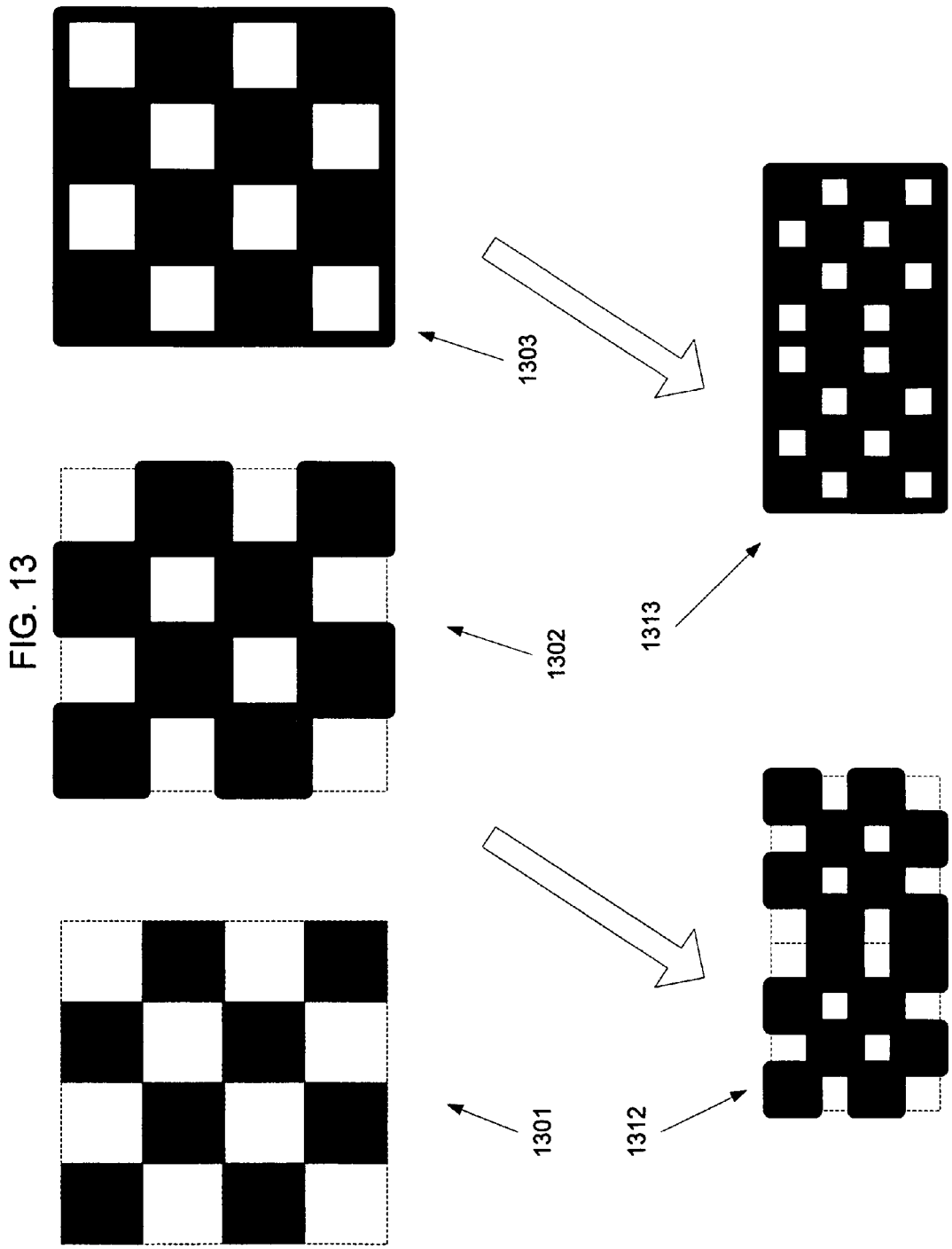
FIG. 13 is a diagram showing samples of enhanced contrast overlay glyphs, according to some embodiments.

FIG. 13 is a diagram showing samples of enhanced contrast overlay glyphs, according to some embodiments. In this example, a 50% black overlay glyph 1301 is a square glyph, consisting of 16 sub-regions, 50% (8) of which are opaque, and 50% (8) of which are clear. In some embodiments, an overlay glyph may be used in visual decryption, for example as described by Naor and Shamir, "Visual Cryptography," presented at EUROCRYPT '94 and currently available on the internet from CiteSeer, which is included herein by reference for all purposes. For example, by placing and perfectly aligning the 50% overlay glyph 1301 on top of second copy of that glyph, for example on a second sheet of paper or on top of a display device an opaque region or a 50% transparent, translucent, uncolored or white region may be created, depending on whether the glyphs are rotated 90 degrees relative to each other or not.

A greater than 50% black glyph 1302 is an example of a glyph with the 8 black subregions enlarged, and includes enlargements that extend beyond the boundary of the overall 4×4 square subregion. Such a glyph may, for example, enlarge a colored subregion by a fixed amount, such as one pixel around the perimeter of a colored subregion, or 1 0% of the width of the colored subregion. Such a glyph may be used to increase the contrast ratio in an overlay between a resulting opaque region and a resulting less than 50% transparent region. For example, by increasing the background light behind overlaid glyphs the partially transparent regions visible through identically oriented glyphs may be made brighter relative to the dark sections created by overlaid pair of glyphs rotated 90 degrees relative to one and other.

A greater than 50% black glyph 1303 is a second example of a glyph that may be used to enhance the contrast ratio in an overlay of related glyphs. In this example, the 16 subregions are framed in black, effectively enlarging the 8 black subregions, as well as framing the 8 clear subregions. Such a glyph may, for example, enlarge a subregion by a fixed amount, such as one pixel around the perimeter of a subregion, or 10% of the width of the subregion.

An example of two glyphs similar to the glyph 1302 rendered next to each other on a single layer is shown in 1312. In this example, each of the glyphs has a 90 degree rotation relative to the other; two of the enlarged black subregions may overlap with subregions of the adjacent glyph; and two of the clear subregions in adjacent glyphs may blend into larger rectangular clear regions.

An example of two glyphs similar to the glyph in 1303 rendered next to each other on a single layer is shown in 1313. In this example, each of the glyphs has a 90 degree rotation relative to each other; the adjacent black subregions from each glyph may overlap; and the adjacent frames around clear subregions in adjacent glyphs may overlap.

Figure 14:
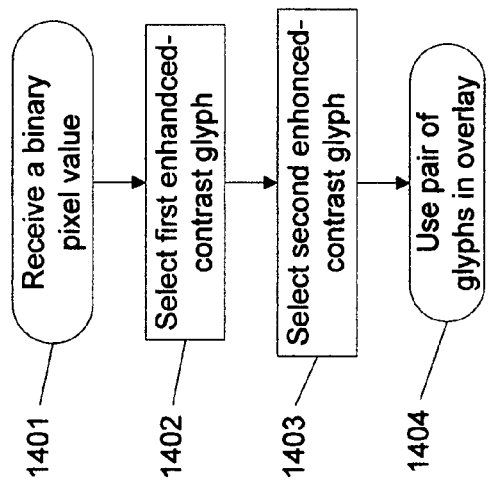
FIG. 14 is a flow diagram of a method for using enhanced glyphs, according to some embodiments.

FIG. 14 is a flow diagram of a method for using enhanced glyphs, according to some embodiments. In this example, a binary pixel value is received (1401). For example, a pixel may have an uncolored or opaque value. In this example, a opaque value representation may be significantly or totally opaque, devoid of light, black, or colored with a tint including for example red, green or blue. In this example, an uncolored value representation may include a region that is at least partially white, clear or translucent.

A first enhanced contrast glyph may be selected (1402). An example of an enhanced contrast glyph is discussed in conjunction with FIG. 13. In some embodiments, an enhanced glyph may have an aggregate colored area that is larger that the aggregate uncolored area of that glyph. In some embodiments, colored areas may be black. In some embodiments, uncolored areas may be white. In some embodiments, uncolored areas may be translucent. In some embodiments, a selection of the first glyph may be made pseudorandomly from among enhanced glyphs.

In this example, a second enhanced contrast glyph is selected (1402). For example, if the pixel provided has an uncolored value, then a second glyph that is substantially similar may be selected. As a second example, if the pixel provided has a dark or colored value, then a glyph may be selected which is opaque in some region that was uncolored in the first glyph. In some embodiments, a glyph may be selected that is opaque in all regions that the first glyph was uncolored. In some embodiments, the second glyph selected may be a normal contrast glyph.

In this example, the pair of glyphs is used in an overlay (1404). For example, the glyphs may be rendered on different layers of a medium in such a way that they are placed on overlapping regions. For example, one glyph may be printed on one piece of paper or plastic, and the other glyph may be printed in an aligned region on a second piece of paper or plastic. In some embodiments, backlighting may be provided so that light transmitted through both glyphs, if any, may be observed.

Figure 15:
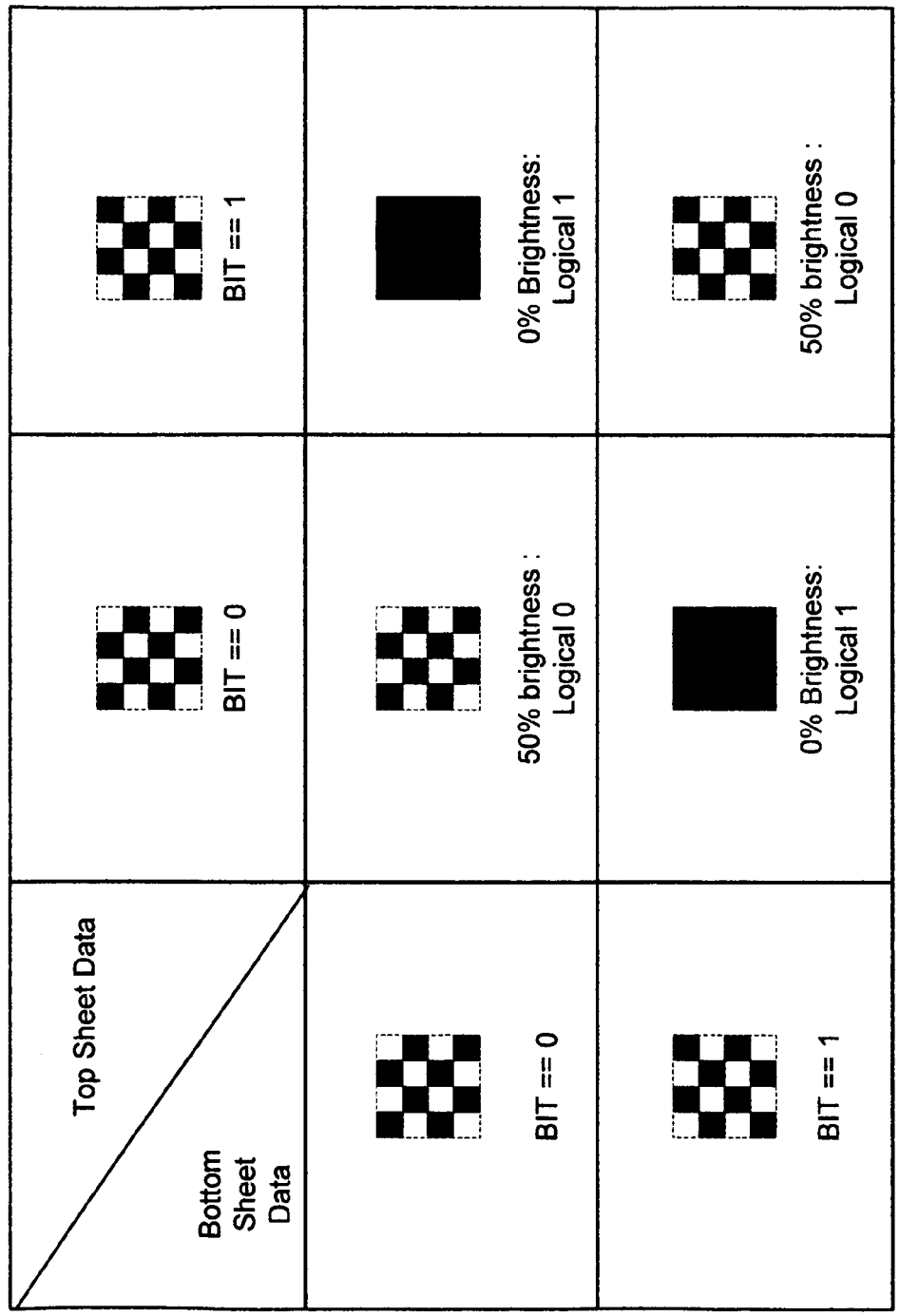
FIG. 15 is a diagram illustrating combinations of perfectly aligned overlaps of two overlay glyphs, according to some embodiments.

FIG. 15 is a diagram illustrating the result of perfectly aligned overlaps of two overlay glyphs, according to some embodiments. In this example, the top row shows the overlay glyph rendered in a given position on a top sheet, the far left column shows the overlay glyph rendered in a the corresponding position on a bottom sheet, and the internal 4 entries in the table show the resulting image formed by the overlay composition of the two glyphs. The glyphs used in this example are the 50% transparent glyphs such as 1301 of FIG. 13, optionally rotated by 90 degrees. The center column illustrates overlap results when a bit value of 0 is represented in the top sheet, and the far right column illustrates overlap results when a bit value of 1 is represented in the top sheet by the same glyph rotated 90 degrees. Similarly, the center row and bottom row correspond to bit values of 0 and 1 respectively, as represented in the bottom sheet by each of the two indicated glyphs.

Figure 16:
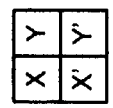
FIG. 16 is a diagram illustrating the result of combinations of aligned overlays of glyphs, according to some embodiments.

FIG. 16 is a diagram illustrating the result of combinations of aligned overlays of glyphs, according to some embodiments. In this example, two bits of data represented by XYB, such as 00B, 01B, 10B, or 11B, are represented on each of two overlapping layers by a glyph. The glyph used for XYB in each layer of this is example is shown in 1601, where X and X' are rendered as complements of each other (clear vs. black), and X is rendered as clear if and only if the corresponding bit is a 1.

The table 1602 in this example shows in the top row the resulting glyphs used for each of the four possible bit patterns and rendered in a top sheet, while the far left column shows the glyphs that may be rendered for those 4 patterns on the bottom sheet. The lower right 16 elements of the table show the resulting overlay combination of the overlapping glyphs.

Figure 17:
FIG. 17 is a diagram illustrating the result of combinations of aligned overlays of glyphs, according to some embodiments.

FIG. 17 is a diagram illustrating the result of combinations of aligned overlaps of glyphs, according to some embodiments. In this example, the glyph used for XYB in each layer of this is example is shown in 1701. The table 1702 provides illustration of the results from overlapping renderings on a top and bottom sheet, as was analogously described in conjunction with 1602 of FIG. 16.

Figure 18:
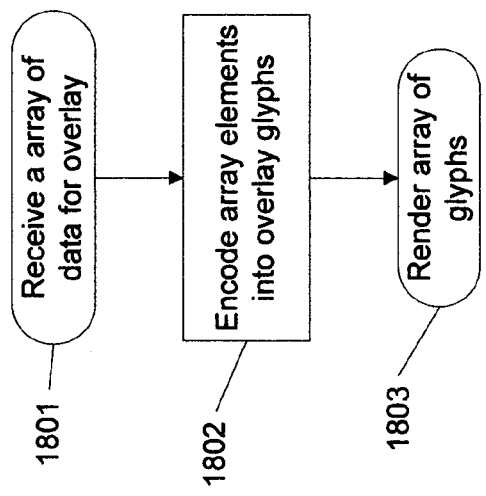
FIG. 18 is a flow diagram of a method for using overlay glyphs to render an array of data, according to some embodiments.

FIG. 18 is a flow diagram of a method for using overlay glyphs to render an array of data, according to some embodiments. In this example, an array of data is received (1801). For example, as discussed in conjunction with FIG. 2, an array of data may be received for printing in 241 after assembling 220. In that example, in the context of a vote 207 which is an image, the array may consist of two-bit elements, in which one bit of each element is an XOR encrypted pixel of that image, and the other bit is a pseudorandomly generated bit.

Each array element may be encoded into an overlay glyph (1802). In some embodiments, a lookup table may be consulted for each element of the array. In the example of two bits of data per array element discussed above, a lookup table such as that provided in the top row of FIG. 17 may be used to translate values to glyphs.

The array of glyphs may be rendered (1803). In some embodiments, rendering may include printing.

Figure 19:
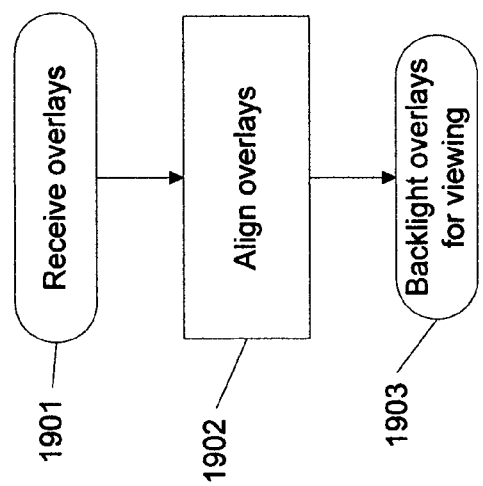
FIG. 19 is a flow diagram of a method for presenting overlays, according to some embodiments.

FIG. 19 is a flow diagram of a method for presenting overlays, according to some embodiments. In this example, two or more overlays are received (1901). An overlay may be a printed sheet, or a presentation on a display device, such as a video monitor or LCD monitor.

The overlays may be aligned (1902). For example, a mechanical device, such a printer, may place and hold the overlays in the desired alignment. In some embodiments, a user may manually align the overlays. For example, alignment may consist of manually aligning the edges of two or more printed sheets. As a second example, the alignment may be performed visually by a user aligning related alignment marks that may be printed on a sheet. Examples of such alignment marks include marks that are rendered on the background overlay and/or foreground overlay as well as physical marks on the background presentation device. In some embodiments, an optical scanner may be used to locate and align the sheets, for example by controlling the position of alignment marks and associated media, such as paper, electromechanically.

Backlighting of the overlays for viewing (1903) may be provided. For example, a light source behind a translucent sheet may provide lighting that may pass through translucent subregions of glyphs in all layers, and may be obstructed by opaque subregions in any layers. For example, two layers printed in 241 and 243 as discussed in conjunction with FIG. 2 may be received, aligned, and backlit.

In some embodiments, the rearmost layer may be a display device that provides illumination, such as an LCD display, and backlighting illumination may be provided only in subregions that are defined as clear in that rearmost rendering.

In some embodiments, such as the assembling of bits as discussed in conjunction with 220 and 221 of FIG. 2, pairs of bits in the top layer and bottom layer may be either identical, or complements. For example, if the top sheet is 01B, then the bottom sheet will either be 01B or 10B. If glyph representation used a static lookup table, such as provided in FIG. 17, then the backlit overlay as described in conjunction with 1903 in this example may reveal to a user an image of the vote 207 of FIG. 2. In this example, only such top-bottom combinations (identical or complements) are facilitated, and a resulting composition of aligned top and bottom sheet glyphs may produce either a 50% brightness (identical glyphs in top and bottom sheet) or 0% brightness (complementary glyphs in top and bottom sheet)

Figure 20:
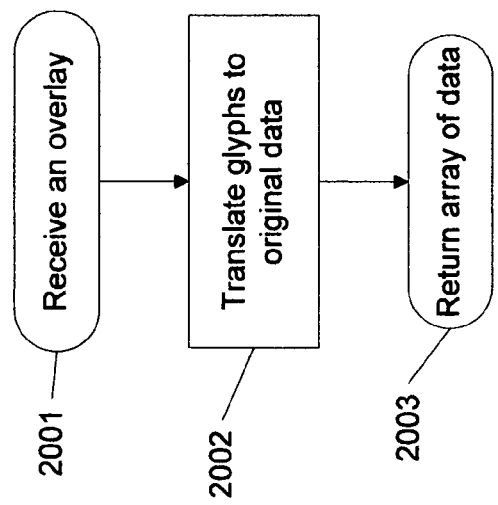
FIG. 20 is a flow diagram of a method for translating an overlay into an array of data, according to some embodiments.

FIG. 20 is a flow diagram of a method for translating an overlay into an array of data, according to some embodiments. In this example, an overlay is received. For example, a sheet containing a collection of overlay glyphs may be received, such as a sheet printed in 241 and discussed in conjunction with FIG. 2.

Individual glyphs may be translated to original data (2002). For example, a printed sheet may be scanned, and location of one or more glyphs on the sheet may be determined relative to an edge of the sheet, or an explicit or implicit alignment mark. An example of an implicit alignment mark is an average or limit of a ragged edge of an encrypted image. Subregions of an overlay glyph may be determined relative to the position of a glyph. If the glyph is sufficiently unique, then the precise data that created the glyph may be determined in this example. For example, when two bit glyphs such as those described in conjunction with FIGS. 16 and 17 are used to represent bit pairs, a bit pair may be uniquely recovered from each glyph.

An array of data may be returned (2003). For example, an array of data, with elements corresponding to one or more translated glyphs, may be returned.

Figure 21:
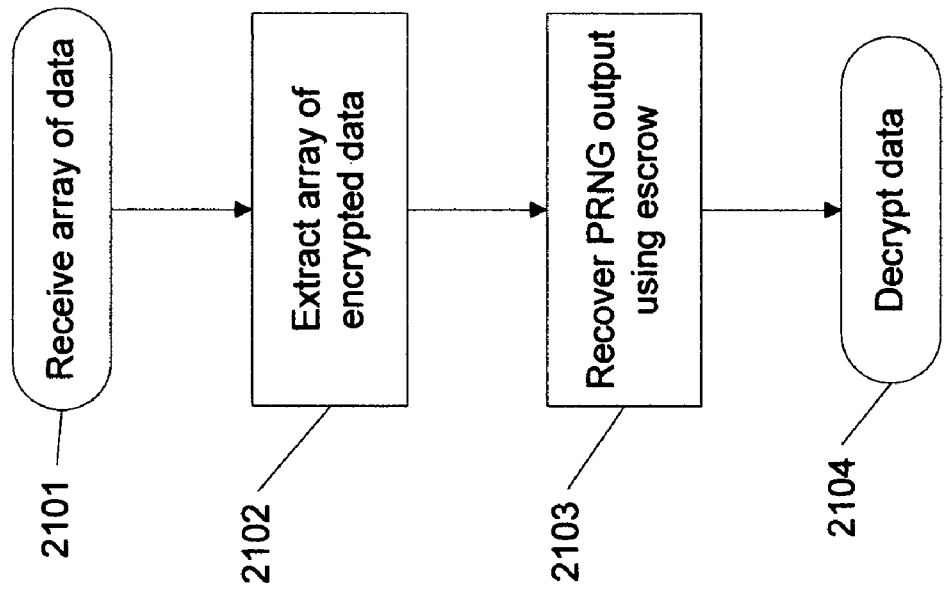
FIG. 21 is a flow diagram of a method for recovering a vote image, according to some embodiments.

FIG. 21 is a flow diagram of a method for recovering a vote image, according to some embodiments. In this example, an array of data is received (2101), in the form of an array of two bit elements. For example, the array of data may be voting data recorded in 250 or 252 as discussed in conjunction with FIG. 2. As a related example, the array may be received by decoding a printed image 241 or 243 as discussed in conjunction with FIG. 2, using decoding techniques discussed in conjunction with FIG. 20.

The encrypted data may be extracted (2102), for example by discarding the high or low order bit of the two bit quantity in each array element. The retained bit may be the result of XOR 212 or 213 as discussed in FIG. 2.

In this example, the discarded bit may be the direct output of a PRNG 211 or 213 as discussed in conjunction with FIG. 2. In some embodiments, otherwise discarded PRNG bits may be used to validate correctness of PRNG functionality. An example of using discarded PRNG bits to validate correctness is to compare an otherwise discarded array with bits generated using an identical seed, such as the seed revealed in 240 or 244 and published in 250 or 252 as discussed in conjunction with FIG. 2.

The encrypting PRNG output may be recovered from the escrow (2103). In some embodiments, the escrow may be obtained from a repository where it was published in 232 as discussed in conjunction with FIG. 2. The PRNG output may be reconstructed from that escrow using techniques discussed in conjunction with FIG. 4.

The data may be decrypted (2104). For example, the encrypting PRNG output may be XORed with the encrypted data to recover a vote image. In this example, the complete image of the vote is recovered.

In some embodiments, redundancy may be added to vote image data prior to encryption or encoding, for example by replicating the value of one or more pixels. In some embodiments, every pixel may for example be replicated into an adjacent row, producing an image that has twice as many rows. In some embodiments, columnar replication may be used. In some embodiments, such redundancy may be used to recover an original vote image when decryption provides only a subset of the encrypted image. For example, if encryption followed by decryption decimates an image, for example using a "checkerboarding" scheme as proposed by David Chaum, and produces only a sampling of an image, such as a checkerboard selection of 50% of the pixels, then the replication redundancy prior to encryption may be used to ensure complete recovery of a vote image. In some embodiments, glyphs corresponding to replicated pixels may have aspect ratios that compensate, partially or fully, for the replication. For example, if columnar replication is used, then glyphs representing square pixels may be used that are approximately twice as high as they are wide.

Figure 22:
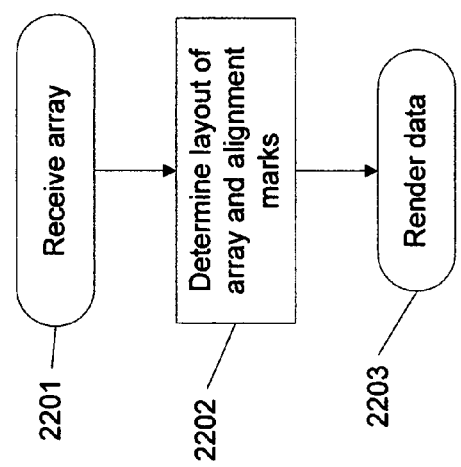
FIG. 22 is a flow diagram of a method for incorporating alignment marks into a rendering of data for overlay, according to some embodiments.

FIG. 22 is a flow diagram of a method for incorporating alignment marks into a rendering of data for overlay, according to some embodiments. In this example, an array of data is received (2201). For example, a two dimensional array of data, each entry of which may consist of 2 bits, or each entry of which may consist of a single bit, may be received. An example of such data was discussed in conjunction with assemblies 220 and 221 of FIG. 1.

Layout of the array and one or more alignment marks may be determined (2202). In some embodiments, the received array may be numeric, and layout may include selection of coding glyphs for the items in the array, such as overlay glyphs. In some embodiments, the array may be a representation of a rendered image, such as a bit map. The layout of one or more alignment marks may include determination of positions for those marks, for example placing a pair of alignment marks at opposing corners of an image.

In some embodiments, alignment marks printed on one or more layers may be used to facilitate correct alignment of overlay glyphs. For example, when using overlay glyphs, alignment markings can be added to some or all layers to facilitate alignment. The addition may be made independently of the media types in each layer (including printed, electronic, etc.). Related alignment marks can be placed on some or all layers. In one embodiment, alignment marks are related (at a given overlapping point on the media) by being identical to those provided in another layer, and in other embodiments they may be related by being complementary to what is provided on another layer. In some embodiments, several alignment marks can be placed on each layer. For example, at least two marks can be placed in relatively distant points of a layer of the media (for example, close to opposing corners of a rectangular image), with related or identical marks on the corresponding areas of some other. In some embodiments, the alignment marks on one layer may be composed of one or more images, some or all of which include two crossing lines. In other embodiments, alignment marks on one layer may be composed of one or more images, some of which include two or more parallel lines. The color of portions of the overlapping alignment mark image may optionally be varied from layer to layer. An example of an alignment mark is two crossed lines, for example two lines crossed at a 90 degree angle, optionally within a circle, and/or optionally missing the central crossing points of the lines.

Data may be rendered (2203). Rendered data may include the display of alignment marks and the representation of the array. Rendering may include printing, for example printing 241 and 243 as discussed in conjunction with FIG. 1.

Figure 23:
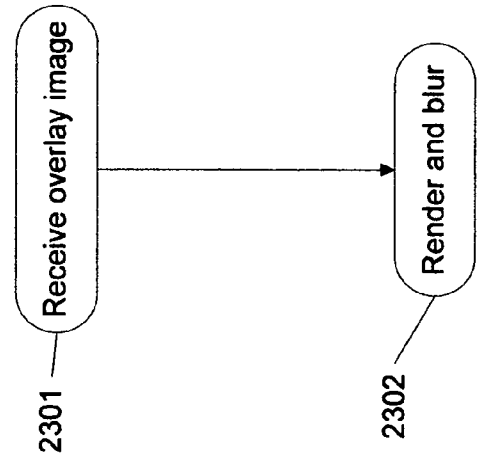
FIG. 23 is a flow diagram of a method for rendering and blurring an overlay image, according to some embodiments.

FIG. 23 is a flow diagram of a method for rendering and blurring an overlay image, according to some embodiments. In this example, an overlay image is received (2301). In some embodiments, the image may be a dot matrix, including for example the result of encoding data using overlay glyphs. In some embodiments, the image may be an array of data, some of which may need to be encoded for rendering using overlay glyphs.

The image may be rendered and blurred (2302). In some embodiments, rendering may include printing. In some embodiments, blurring may be used to enhance readability of images, such as encrypted images superimposed for visual decryption. A blurring may for example be constructed by physically overlaying an image with a translucent material, such as a sheet of paper or plastic (such as Acrylite GP DP-9) or glass (such as Saint-Gobain Smoothlite), and/or by relocating (exchanging) one or more subregions or pixels of some or all overlay glyphs placed in a specific position in a rendering, with subregions or pixels of some or all overlay glyphs placed in a nearby position in a rendering. For example, when an image is rendered using overlay glyphs as part of a visual cryptographic decoding, subregions or pixels that compose a glyph may be exchanged (before rendering) with subregions or pixels in an adjacent glyph. In this example, an exchange may be performed for all glyphs that might be selected to overlay the exchanged regions. In some embodiments, this relocation of subregions may be performed in all layers of the renderings. As an example, when a glyph is composed of two subregions AB, and is adjacent to a glyph having two subregions CD, then rather then rendering the adjacent glyphs as ABCD, they can be rendered as ACBD. Blurring may be performed across a rendered image, with consistent or pseudo-random variations across the image, such as varying as a function of the row whether glyphs in columns 2 and 3 are blurred, or whether columns 1 and 2 as well as 3 and 4 are blurred, or all three blurrings are used. In some embodiments, blurring may be performed between subregions in nearby rows and/or between nearby columns of glyphs.

Figure 24:
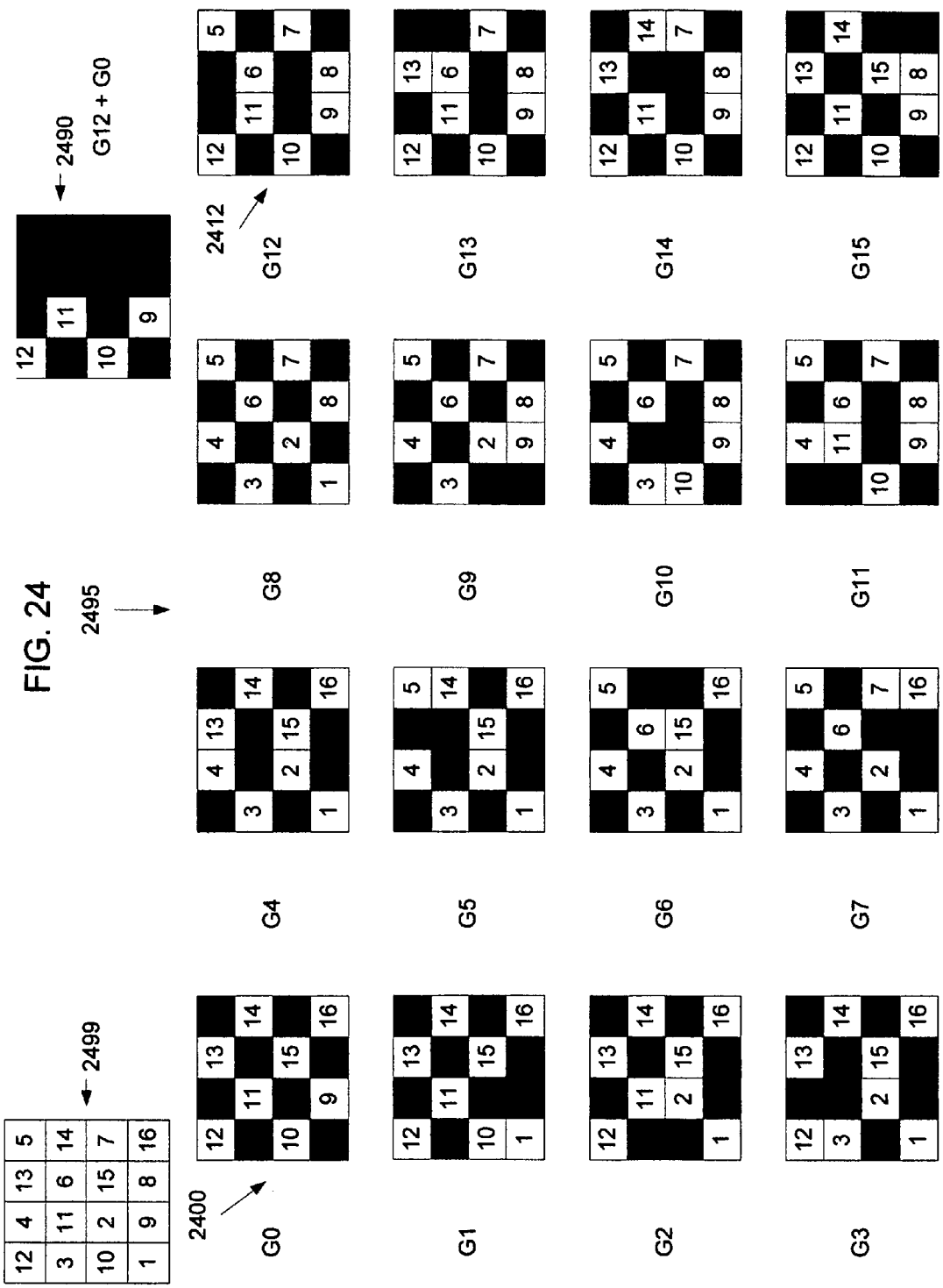
FIG. 24 is an illustration of a set of overlay glyphs for use in creating a gray level composite image, according to some embodiments.

FIG. 24 is an illustration of a set of overlay glyphs for use in creating a gray level composite image, according to some embodiments. In this example, an overlay glyph is defined within a rectangular region, which consists of 16 subregions with reference numbering shown in 2499. When more than one glyph is overlaid in a single region, such as printed on overlapping media, such as translucent or transparent paper, a composite glyph is formed in this example. The composite glyph may provide a gray level of net transparency in the rectangular region. The gray level may be between 0 (opaque) and the transparency of an overlay glyph. In this example, all glyphs have an individual transparency of 50%, and a total of 9 gray levels may result by overlaying various glyphs.

Figure 25:
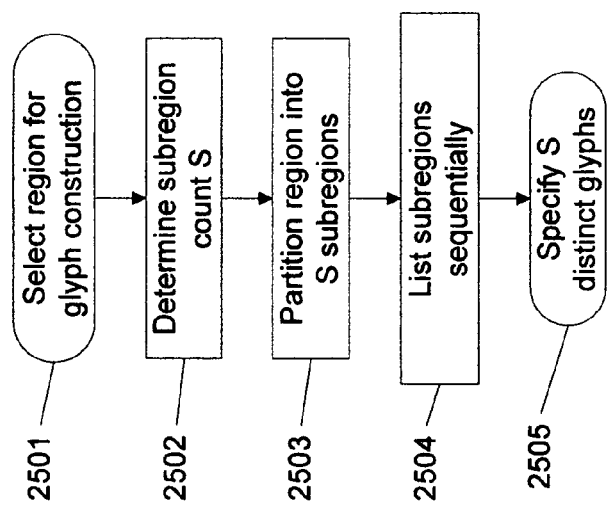
FIG. 25 is a flow diagram of a method for constructing a set of overlay glyphs for presentation of gray levels, according to some embodiments.

FIG. 25 is a flow diagram of a method for constructing a set of overlay glyphs for presentation of gray levels, according to some embodiments. In this example, a region is selected (2501). For example, a contiguous rectangular region may be selected. In some embodiments, noncontiguous regions may be selected.

A subregion count S may be determined (2502). In this example, to support rendering of G gray levels, S may be selected to be at least 2*G−2. For example, to support 9 gray levels, 16 subregions are needed.

The region may be partitioned into S subregions (2503). For example, a rectangular region may be divided into a lattice of subregion rectangles. In some embodiments, each subregion may be of substantially similar total geometric area. In some embodiments, each subregion is contiguous. In some embodiments, some subregions may include noncontiguous parts.

The subregions may be ordered sequentially (2504). For example, each of the S subregions may be identified by an integer from 1 to S or 0 to S−1 for reference, and those reference numbers may define the sequencing of the subregions. For example, 2499 of FIG. 24 provides a sample reference numbering of 16 subregions within a rectangular region. In some embodiments, a reference numbering may be selected to reduce or minimize contiguous subregions associated with consecutive numbers.

A total of S distinct glyphs may be specified (2505). A glyph may be specified to have a first clear subregion at some position in the sequence of subregions, followed by G−2 sequentially identified subregions that are also clear, and the following S−G+1 subregions may be opaque. In this example, the subregion that sequentially follows the last subregion is defined to be the first. Using the example reference numbers for each subregion, the subregion referred to as S is followed sequentially by the subregion with the reference number 1. Each glyph may be associated with a reference number in a sequence of glyphs in the range of 1 to S or 0 to S−1 that is associated with, for example equal to, the first clear subregion in the glyph. In some embodiments, the "first" clear subregion is only considered to be 1 if the subregion S is not clear, as the "first" clear subregion is followed by G−2 sequential subregions that are clear.

For example, the glyph 2400 of FIG. 24 has opaque sequential subregions 1-8, and clear sequential subregions 9-16. As a second example, the glyph 2412 of FIG. 24 has opaque sequential subregions 13-16 and 1-4, and clear sequential subregions 5-12.

The lower section 2495 of FIG. 24 provides examples of 16 distinct overlay glyphs, created as just described. Each of the overlay glyphs, such as 2400 and 2412, has 8 opaque subregions, and 8 clear subregions.

Figure 26:
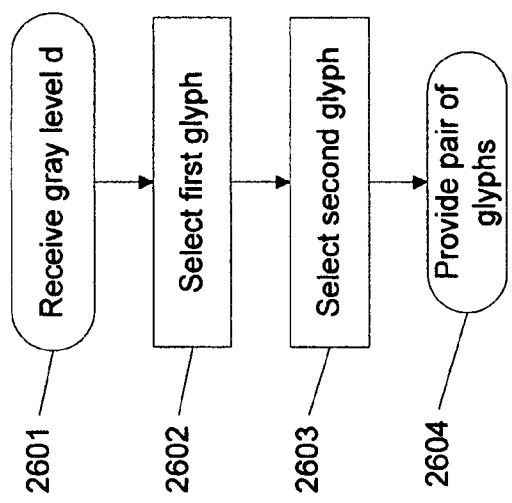
FIG. 26 is a flow diagram of a method for encoding a gray level into two overlay glyphs, according to some embodiments.

FIG. 26 is a flow diagram of a method for encoding a gray level into two overlay glyphs, according to some embodiments. In this example, a gray level d may be received (2601). In this example, a gray level d of 0 will produce a maximally transparent net overlay brightness, and a larger positive value of d will produce progressively darker net overlay brightness. In this example, d is in the range of gray levels appropriate to the collection overlay glyphs. A set of S glyphs constructed as described in conjunction with FIG. 25 may be provided, such as the glyphs described in FIG. 24. In some embodiments, the technique of FIG. 26 may be repeated for all pixels in an image, by processing the gray level of each pixel.

A first glyph may be selected (2602). In some embodiments, a fixed pattern of selection of a first glyph may be used, for example always selecting a specific glyph, or regularly cycling through available glyphs each time this process is performed. If encryption is being applied, then a pseudorandom selection of the first glyph may be performed in this example. For example, a pseudorandom number may be reduced modulo S−1 to select a glyph from among S possibilities. In some embodiments, a pseudorandom number may be dependent on a private key, or the position of the encoded pixel in an image that is being encrypted.

A second glyph may be selected (2603). For example, if the glyphs are constructed as discussed in FIG. 25, with reference numbers as discussed, then a second glyph may be selected by adding the gray level d to the glyph reference number of the first glyph, or by subtracting the gray level d from the glyph reference number of the first glyph. For example, if d is 0, then the second glyph is selected to be identical to the first glyph in this example. If the second glyph's reference number is greater than S, then the sum is reduced by S in this example. If the second glyph's reference number is less than the minimum reference number, then it is increased by S in this example. For example, if the first glyph's reference number is S, and the value of d is 1, then S+d is equal to S+1, which is greater than S. In this example, the sum may be reduced by S, and a glyph with reference number (S+1)−S, or 1, may be selected.

The pair of selected glyphs may be provided (2604). Provided glyphs may be used for rendering, for example placing a first glyph on a top layer and the second glyph on a lower layer, so that they may be aligned and viewed. The properly aligned physical overlay of any two such overlay glyphs, for example constructed as discussed in FIG. 25, results in a continuous sequential series of opaque subregions. When two glyphs are overlaid, their net (overlay) darkness varies proportionately to the distance between the start of each glyphs sequentially darkened subregions. For example, the overlay of glyphs 2400 and 2412 is shown as 2490 in FIG. 24, and includes opaque subregions 13, 14, 15, 16, 1, 2, 3, 4, 5, 6, 7, and 8, for a total 12 opaque pixels, and 4 clear pixels, and hence a 75% transparency.

In some embodiments, a pair of returned glyphs as discussed in conjunction with 2604 may be published and presented in any way that permits visual overlay. Examples include printing on paper or a transparent or translucent medium, or displaying one layer on a display device such as a CRT and providing a printed overlay of another layer, displaying two layers on two electronic display devices that can be overlaid, such as transparent LCD panels, and algorithmically combining two images received electronically and combining them on a single display device such as a CRT.

In some embodiments, a glyph set used to represent a gray level in one location in an image may be different from a glyph set used in another location in an image. For example, the region and shape encompassed may vary between glyph sets. In some embodiments, overlay glyphs that can render 128 distinct gray levels may be specified using 254 subregions per glyph. In some embodiments of such glyphs, the first (for example, top left) glyph region may consist of 16×16 subregions, minus two subregions (for example, at the bottom right), for a total of 254 subregions. The next glyph region (for example, immediately to the right of the first glyph) could consist of 16×16 subregions, plus the two subregions from the first glyph, minus 4 subregions from the right hand side of the 16×16 region. This pattern could continue, in which a 16×16 glyph is usually augmented by the excess subregions on the previous glyph (to the left), and excess subregions in that new glyph are usually contributed to the next glyph's footprint (to its right). After a total of 8 such glyphs, the augmentation can amount to a full column of subregions, and the center of the next 16×16 glyph can be established one subregion's width to the left of its canonical position. This process is an example of the use of non-square glyph regions, and is also an example of the use of different glyph sets for different regions, as well as the use of a rectangular array of subregions inside a non-rectangular glyph region.

As a second example of the above 128 gray level glyph definitions, a 16×16 area of subregions can again be used as the basis of each glyph, but the excess subregions can be contributed to distinct adjacent glyphs. For example, since each glyph consists of 254 subregions, the excess subregions (in an otherwise square 16×16 area) can be contributed so that one extra goes to the next glyph to the right, and the other extra goes to the next glyph to the bottom. After 16 such columns of glyphs, the accumulated excess subregions can total a full edge of the next 16×16 glyph, and its effective center can be shifted one subregion's width to the left. Similarly, after approximately 16 rows of subregions, the accumulated subregions can cause the next row of glyphs to be centered one subregion's height higher.

Using the above approach (contributing some extra subregions to the right, and some downward), nearly square collections of subregions can be used to represent square glyph areas. As another example, an 8×8 (square) glyph region, with glyphs having 254 subregions, can be placed in an almost square 128×127 subregion rectangle. As another example, a square 2544×2544 region, with glyphs occupying each region having 254 subregions each, can be placed in a 557568× 557567 subregion rectangle. As another example, a 60×60 region, with glyphs having 14 subregions (potentially providing 8 gray scale levels), can fit exactly into a 225×224 subregion rectangle. As another example, a 1798×1798 region, with glyphs having 14 subregions, can fit exactly into a 6728× 6727 subregion rectangle. As another example, a 6×6 region, with glyphs having 510 subregions (potentially providing 256 grayscale levels) can perfectly fit in an almost square 136× 135 subregion rectangle. As another example, a 1544×1544 region, with glyphs having 510 subregions, can perfectly fit in an almost square 557184×557183 subregion rectangle.

Figure 27:
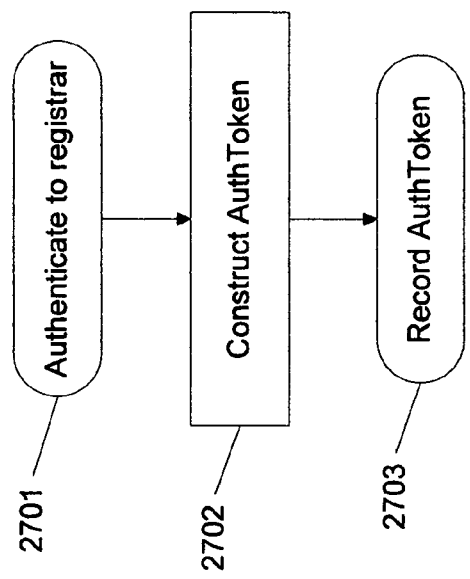
FIG. 27 is a flow diagram of a method for establishing authentication credentials, according to some embodiments.

FIG. 27 is a flow diagram of a method for establishing authentication credentials, according to some embodiments. In this example, a user authenticates an identity to a registrar (2701). In some embodiments, a user may be an eligible voter, a registrar may be a government official empowered to perform voter registration, and the authentication may include presentation of a proof of identity such as a driver's license, and proof of residency.

An authentication token may be constructed (2702). Examples of an authentication token include a shared secret, such as a password or passphrase, and a physical device, such as an electromechanical device that contains or can process a private cryptographic key for use in authentication. A shared secret may be constructed by the user, or the registrar, or an assisting device, or a combination of one or more of the above.

A record may be made of the distribution of the authentication token (2703). For example, if the authentication token is a passphrase, a record of the passphrase may be recorded by the registrar. As another example, if an authentication token is a physical device, then a record may be made of details of that device(s), such as recording a public key associated with the device, or a serial number associated with the device. An example of a physical device includes a set of one or more RFID tags. In some embodiments, more than one authentication token may be provided, for example one valid authentication token and one or more invalid authentication tokens.

Figure 28:
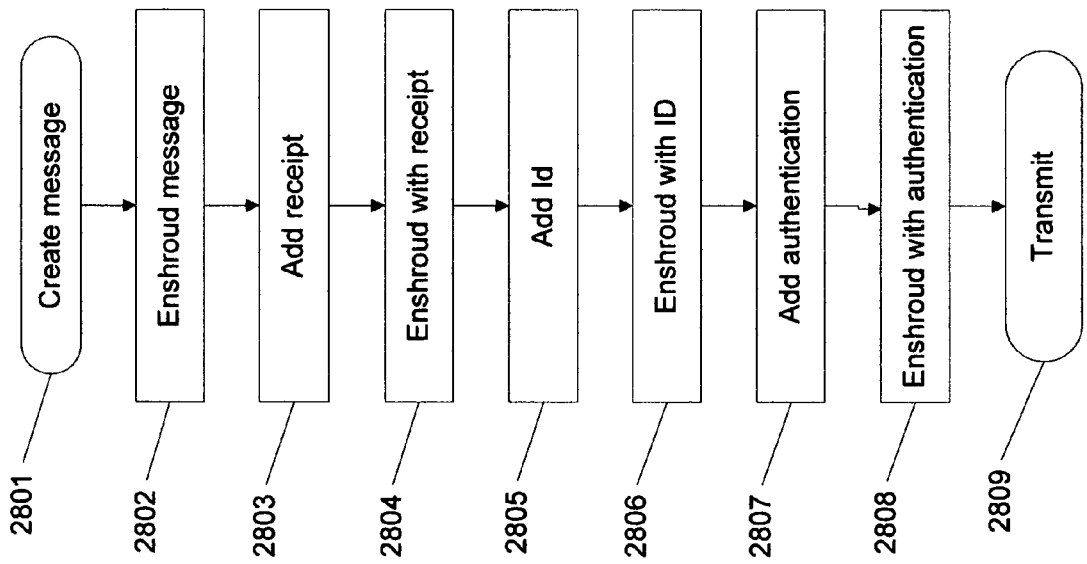
FIG. 28 is a flow diagram of a method for creating a partially anonymized message, according to some embodiments.

The authentication token may be used by the user as an authentication credential, for example as discussed in conjunction with FIG. 28.

FIG. 28 is a flow diagram of a method for creating a partially anonymized message, according to some embodiments. In this example, a user creates a message (2801). In some embodiments, a message may be a vote, such as a vote to be transmitted as part of an absentee ballot. A vote may for example be in the form of a printed ballot that is marked with preferences by hand, or may be a printed ballot created by a user's computer, or may be a vote contained in digital media, such as solid state or magnetic media.

In some embodiments, when a message such as a vote is constructed, a user may use trusted software delivered via a trusted channel. An example of trusted software distribution is discussed in conjunction with FIG. 30, and an example of executing trusted software is discussed in conjunction with FIG. 31. For example, media such as a CDROM may be acquired from a trusted source such as a governmental agency. Such media may contain trusted application software and/or a trusted copy of an operating system. For example, a bootable CDROM may be used that contains Microsoft Windows 98 or Mac OS X along with ballot generation software. Ballot generation software may for example include voting options appropriate to a voter such as candidate names and line items applicable to the voter's voting district, and public keys needed for encryption or authentication. In some embodiments, such balloting software may create a printed ballot, or a file representing a ballot. In some embodiments, some additional steps described below may be performed by such balloting software.

The message may be enshrouded (2802). For example, a paper message may be placed into a sealed envelope to enshroud the contents. An electronic representation of a vote may be enshrouded by means of encryption, for example by encrypting with a public half of a public/private key pair, or by visually encrypting using an escrowing PRNG as described in conjunction with FIG. 3. An encrypted message, such as a vote, may optionally be printed using methods such as are discussed in conjunction with FIG. 2.

In some embodiments, a second computer may be used to validate the production of a message. For example, if a message is enshrouded using visual encryption, a second computer, such as a second home computer, may independently generate a decryption mask.

A receipt may be added (2803). In the case of a sealed envelope, an example of a receipt is a hand-written phrase on the outside of the envelope. In some embodiments, a recipient may allow a sender to review a list of received message receipts, including receipts associated with messages sent by a given sender. In an electronic form, a receipt may include the addition of more data, or the embedding of receipt data into an existing enshrouded message. An example of embedding receipt data into an existing enshrouded message is to include an area in a message for receipt data, for example an area that is all zero bits, or an area that is prepopulated with receipt information. A receipt may be added by XORing a receipt into an enshrouded message in an area designated for receipt data.

A message with a receipt may be enshrouded (2804). For example, a paper envelope provided earlier may be enclosed in a new outer envelope. As another example, enshrouding of an electronic message may be performed by encrypting, for example by encrypting with a public half of a public/private key pair.

An identifier specifying the sender may be added (2805). For example, in paper based embodiments, the name of the user may be signed, written or printed on an envelope. In an electronic embodiment, a user may cryptographically sign the data.

A message with an ID may be enshrouded (2806). For example, in a paper based embodiment, an envelope may be used to surround prior envelope(s) or message. As another example, in an electronic embodiment, the data may be encrypted.

Authentication may be added (2807). Authentication credentials may be based on an authentication token, such as discussed in conjunction with FIG. 27. For example, in a paper based embodiment, where an authentication token of the form of a shared secret has been provided, a copy of that shared secret may be affixed to the current set of enclosing envelopes, if any, or to the message. If for example the authentication token is an electromechanical device, then that device may produce a message or secret for use in this authentication, such as a word or phrase. If for example the authentication token includes one or more RFID tags, then such a tag may be affixed.

A message with an authentication may be enshrouded (2808). For example, in a paper based embodiment, an enclosing envelope may be applied.

The fully enshrouded message may be transmitted (2809). For example, in a paper based embodiment, an outer envelope may be addressed and send by mail to a receiving party. In an electronic environment, a digitally enshrouded message may be transmitted via a network such as the internet, or the digitally enshrouded message may be recorded on digital media such as magnetic, optical or solid state media and physically transmitted to the recipient.

Figure 29:
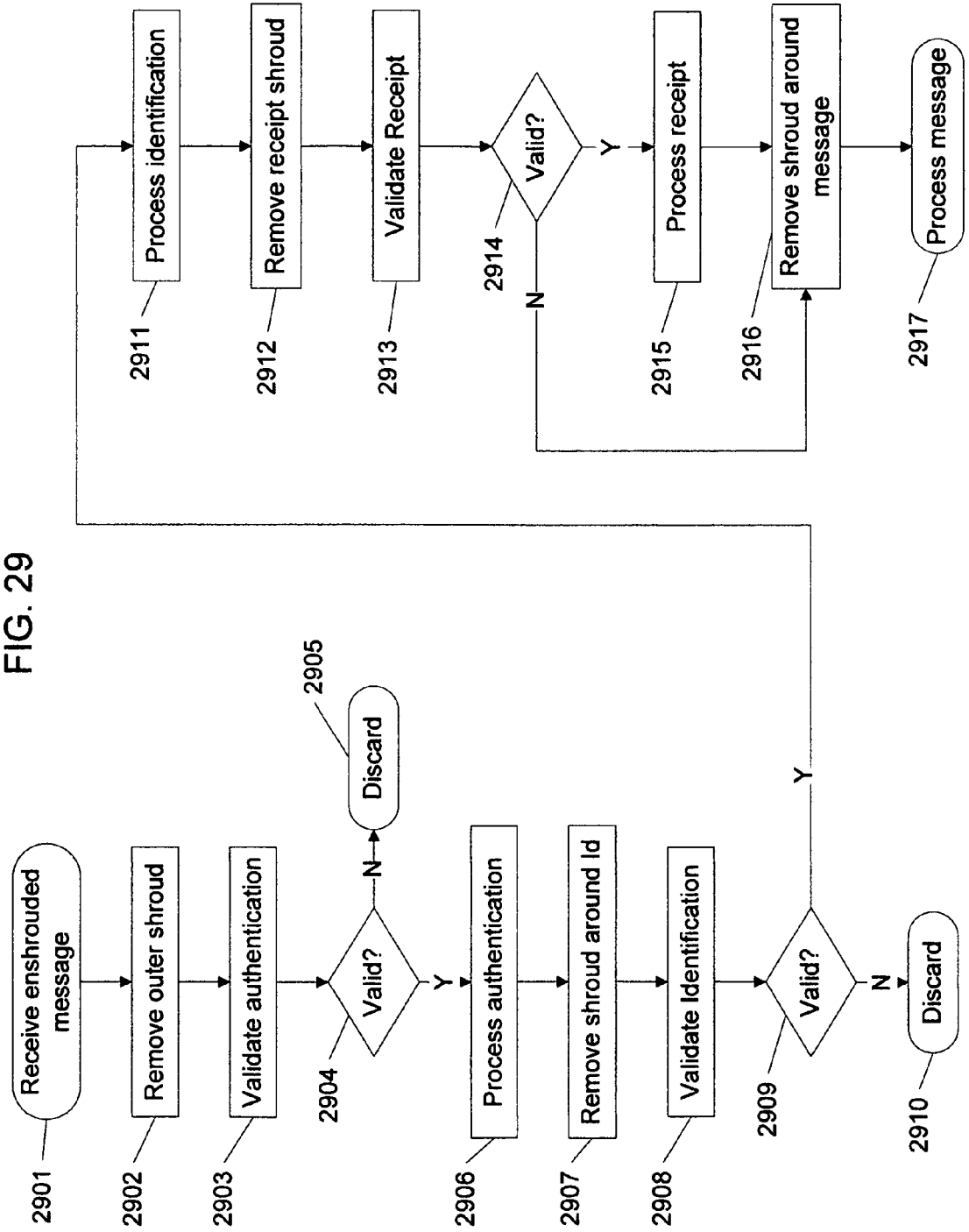
FIG. 29 is a flow diagram of a method for processing a partially anonymized message, according to some embodiments.

FIG. 29 is a flow diagram of a method for processing a partially anonymized message, according to some embodiments. In this example, a message is received that may be enshrouded (2901). For example, a message constructed and enshrouded as discussed in conjunction with FIG. 28 may be received. Examples of reception include arrival of an envelope, such as via the US Postal Service, receipt of digital information over a network such as the internet, and receipt of digital media such as magnetic, optical or solid state media containing a message. In some embodiments, a message may include a ballot.

An outer shroud may be removed (2902). For example, an outer envelope may be removed, or data may be decrypted to some extent, for example using the private half of a public/private key pair.

An exposed authentication token may optionally be validated (2903). For example, a shared secret may be readable, and may be checked against a list of valid authentication credentials. Examples of valid credentials include authentication tokens distributed by a process such as was discussed in conjunction with FIG. 27.

If an exposed authentication credential is not determined to be valid (2904), then the remaining (possibly enshrouded) message is discarded in this example (2905). If an exposed authentication credential is determined to be valid, then related authentication information is processed in this example (2906). An example of related information includes the name of the user that was authorized to use the authentication credential. A second example of related information may include information such as a passphrase that may be cross-checked against user identity information if and when such identity information is revealed. In some embodiments, absence of an authentication credential may be interpreted as valid, and there may be related information associated with such an absence, such as a statement that no authentication credential was supplied. In some embodiments, an identifier associated with the message may be associated with authentication information, for example authentication information that may be cross-checked with identity information, and transmitted to an authentication entity. In some such embodiments, authentication information may be discarded after transmittal to an authentication entity.

Processing of authentication (2906) may include adding some related information to the remaining message data, and such data that may be used in concert with other potentially enshrouded information, for example by cross checking. For example, in a paper based scenario, data for later cross-checking when another enclosing envelope is opened may be affixed to that envelope. In an electronic shrouding example that makes use of encryption, data for later cross checking may be inserted into the shrouded message, such as by appending it (with optional appropriate encryption), or by XORing into a predetermined section of a shrouded message.

In some embodiments, processing of an authentication (2906) may include recording that a credential has been used. In some embodiments, the number of uses of a credential may be limited, for example limited to one use. In such embodiments, use beyond a threshold may be determined to be invalid.

A shroud around identification information may be removed (2907). For example, in a paper based embodiment an enclosing envelope may be removed, or in an encryption based embodiment another layer may be decrypted, for example using the private half of a public/private key pair.

An exposed identification may be validated (2908). Validation may include checking against a list of authorized users. Validation may include checking the validity of an identifying signature, for example validation of a cryptographic signature, or validation of a written signature against a prior facsimile.

Validation of identification may include cross checking information related to authentication. In some embodiments, validation may include associating identification information with an identifier associated with the message and transmitting it to an authentication entity. An authentication entity may check the identification information against authentication information such as a passphrase that is associated with the identifier, and determine whether the authentication information is validly associated with the identification information. In some embodiments, in which related authentication information was XORed into the enshrouded (encrypted) message, validation may include verification that a portion of the message is a predetermined pattern, for example because the authentication related information canceled out information provided in a portion of the plaintext identification. Examples of a predetermined pattern include a blank area, an area with a regular pattern, and an area which includes data conforming to a coding standard. One example of a coding standard is arbitrary data plus an error detecting code, such as a parity or checksum for the random data. In some embodiments, validation may include determining that a portion of the message is well-formed, for example that it contains appropriately formatted data. In some embodiments, cross checking may include an affirmative comparison between some data associated with the identification, and the data that was related to the authentication credentials. An example of can affirmative comparison is validating that two pieces of related information are similar.

In some embodiments, validation of the identification may include testing to see if the identification has been used more often than a threshold number of times, such as used more than once. For example, in a voting application, validation may include recording that an identified user has voted, and determining that the identification is invalid if more than one voting message has been received from an identified user.

If the identification is not determined to be valid (2909), then the remaining message is discarded in this example (2910). If the identification is determined to be valid, then related information is processed in this example (2911). Related information may include the identity of the user, information related to the identity such as information in an external list associated with the identity, information related to the authentication credential, information constructed as a function of one or more of the previous items, such as via a cryptographic hash.

Processing of identification related information (2911) may include adding some related information to the remaining message data, and such data may be used in concert with other potentially enshrouded information, for example by cross checking.

A shroud around receipt information may be removed (2912). For example, in a paper based embodiments an enclosing envelope may be removed, or in digital embodiments another layer may be decrypted, for example using the private half of a public/private key pair.

Receipt information may be validated (2913). In some embodiments, all receipt information may be considered valid. In some embodiments, only receipt data of a given format or size may be considered valid. In some embodiments, the absence of receipt data, such as no data or a null string, may be considered valid.

If the receipt data is determined to be valid (2914), then information related to the receipt data may be processed in this example (2915). Information relating to the receipt data may include the receipt data, information related to identification, information relating to authentication, or a calculated combination of one or more items, for example calculated via a cryptographic hash function or encryption function. Processing may include recording or publishing such information. For example, recorded receipt related information may be made available to a user that constructed a message. Processing may include adding some information to a remaining (possibly shrouded) message, and such data may be used in the processing of the possibly enshrouded message.

In this example, if the receipt data was invalid, or after the receipt is processed, a shroud (if any) is removed from the message (2916). For example, in a paper based embodiment, a containing envelope may be removed, or in a cryptographic embodiment, a message may be decrypted, for example using the private half of a public/private key pair, or by reconstructing an image using visual cryptography and a data regenerated from an escrow.

A message may be processed (2917). For example, in a voting scenario, processing may include submitting a (vote) message for inclusion in a tally. In some embodiments, elements of the message may include data, such as related information added to the message in the above process. Such additional data may become part of the message and include directives for handling the message, for example an assertion that the remainder of the message should be discarded, or an assertion that the message is valid.

An example of the techniques exemplified in FIGS. 27, 28 and 29 applied to paper-based absentee voting is for a voter to supply identification to a registrar of voters (4401) and specify a passphrase (2702). The registrar associates the passphrase with the voter's identity (2703). The voter fills out an absentee ballot (2801) and includes his or her identity (2805) and the passphrase on the ballot or an enclosing envelope (2807). The voter sends the ballot to an election agency (2809). The election agency retrieves the passphrase (2906) and identification (2908). If the passphrase is determined to match the passphrase on record for the voter and the voter is determined not to have previously submitted an authenticated ballot (2909), then the ballot is counted in this example (2917). If the passphrase is determined not to match the passphrase on record for the voter or if the voter is determined to have previously submitted an authenticated ballot (2909), then the ballot is discarded in this example (2910).

Figure 30:
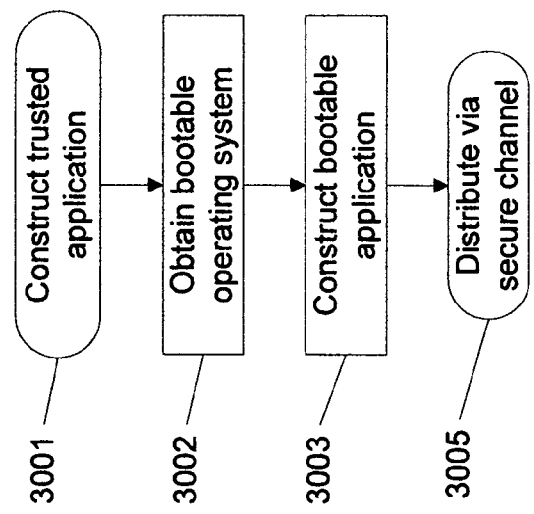
FIG. 30 is a flow diagram of a method for distributing trusted software, according to some embodiments.

FIG. 30 is a flow diagram of a method for distributing trusted software, according to some embodiments. In this example, a trusted application is constructed (3001). For example, an application may be built that allows a voter to enter votes, encrypt those votes, and records an encrypted representation of the voter's intent, for example by printing, by recording the intentions in a file, or by transmitting the intentions via a network. Another example of a trusted application is an application that may be used to validate signatures, including digital signatures and hashes including cryptographic hashes. For example, such an application may produce a checksum when directed at a file, and that checksum may be validated against a checksum received via a trusted channel. As another example of the use of such a validation application, it may be used to validate trusted software, such as a bootable trusted application.

A bootable operating system may be obtained (3002). For example, a copy of Microsoft Windows 98, that can fit on a CDROM, and can be used to boot an IBM PC compatible computer, may be obtained. As another example, a copy of Linux that can fit on a CDROM and can be used to boot a personal computer may be obtained. As a third example, a copy of Microsoft DOS 6.0 that can fit on a floppy disk and can be used to boot an IBM PC compatible computer may be obtained. In some embodiments, more than one bootable operating system may be obtained, such as MAC OS-X and Windows 98. In such examples, both operating systems may be supplied, and the operating system appropriate to the eventual host processor may be automatically selected, for example selected by the BIOS of the host computer.

A bootable application may be constructed (3003). For example, files that direct an operating system to run an application during or after completion of a boot sequence may be constructed to direct the running of the trusted application. For example, in Microsoft DOS 6.0, a file AUTOEXEC.BAT may be placed in a root directory containing the name and path of the trusted application, and that application will be run automatically when the operating system completes it boot sequence. In some embodiments, an image may be created, for example an image of blocks of a bootable CD-ROM or floppy disk. The image may include one or more bootable operating systems and trusted applications. In some embodiments, information specific to an intended recipient such as a voter may be included in an image, for example by constructing an image including recipient-specific information or by inserting recipient-specific information into an image. Examples of recipient-specific information include identity information, authentication information, and local voting options.

The bootable application may be distributed via a secure channel (3005). For example, the bootable application may be placed on media, such as a CDROM or floppy disk, and that media may be distributed by a secure physical channel. One example of placing a bootable application on media is writing an operating system and bootable application onto media. Another example of placing a bootable application on media is writing an image onto the media, or stamping media with a preconstructed template representing an image. An example of a secure physical channel is hand delivery by trusted agents. Another example of a secure physical channel is distribution by a trusted commercial agent, such as a store. Another example of a secure physical channel is distribution by trusted political group, such as a political party. Another example of a secure channel is a channel in which interference is punishable by law, such as the United States Postal Service. Another example of distribution by a trusted channel is electronic distribution that is validated by a trusted application after receipt by a user. An example of electronic distribution is distribution via a network, such as the Internet.

Figure 31:
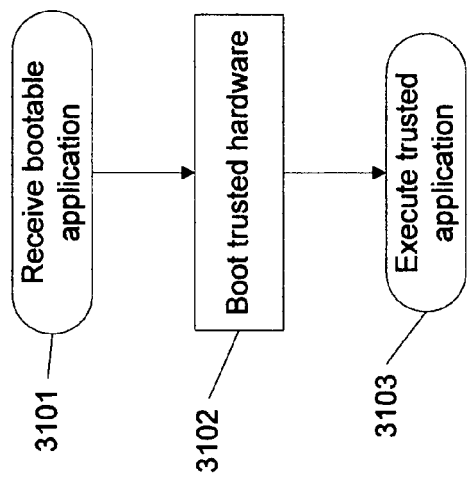
FIG. 31 is a flow diagram of a method for executing trusted software, according to some embodiments.

FIG. 31 is a flow diagram of a method for executing trusted software, according to some embodiments. In this example, a bootable application is received (3101). In some embodiments, a bootable application may be received on removable media, such as a CDROM or a floppy disk. In some embodiments, a bootable application may have been created as discussed in conjunction with FIG. 30.

In some embodiments, the bootable application may be received via a trusted channel. An example of a trusted delivery channel is hand delivery, for example by a trusted party, or a police enforced trusted channel, such as the US Postal Service.

In this example, trusted hardware may be initialized by the received software (3102). An example of trusted hardware is a personal computer owned by a user. Examples of initializing trusted hardware turning the computer off and on, selecting "restart" from a Windows menu, and any other way to place the computer in a standard initial configuration. The bootable application may be read into a memory associated with the trusted hardware. Reading the bootable application may include loading media, such as a CDROM containing the bootable application; optionally configuring the trusted hardware to boot the media, for example by configuring the ROM BIOS; and allowing the computer to run software from the CDROM during its bootstrap operation, for example under control of the ROM BIOS in the trusted computer. In some embodiments, booting may include running an operating system provided with the bootable application.

In this example, the trusted application is executed (3103). In some embodiments, the trusted application may be automatically executed. For example, a booted operating system may be preconfigured to execute an application provided. An example of such a configuration with a Microsoft DOS operating system includes the placement of the path and name of an application in the AUTOEXEC.BAT file on the bootable disk.

In some embodiments, the trusted application may be a voting application. For example, it may be an application that requests voter input, and constructs a complete ballot for submission. Examples of such applications are discussed in conjunction with foregoing Figures.

In some embodiments, options appropriate to an election may be automatically provided with the bootable voting application. For example, a list of candidates in a district, and propositions for a given election, may be preconfigured in the voting application.

In some embodiments, a trusted voting application may electronically submit a voter's intent. For example, a user's vote may be transmitted via a network, such as the internet, or using a removable electronic storage device, such as a floppy disk or compact flash memory. In some embodiments, transmissions may use cryptographic methods to protect the integrity and privacy of the voter's intent. For example, electronic submissions may use SSL or S/MIME.

In some embodiments, a trusted application may produce a printable representation of a voter's intent. For example, the application may print the voter's intent, such as in a completed ballot, optionally encrypted and/or authenticated. In some embodiments, the printable representation may be stored on a persistent storage device, such as a disk, including the trusted computer's hard disk or removable storage such as a floppy disk, flash memory or a memory in a smart card. In some embodiments, a printed vote may be submitted, for example transmitted by mail, or hand delivered to a polling place.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for privacy, comprising:
   using one or more processors to perform steps including:
   providing a pixel value;
   determining that the pixel value is associated with a coloration;
   selecting a first glyph;
   wherein a first aggregate opaque area associated with the first glyph is larger than a second aggregate uncolored area associated with the first glyph; and
   selecting a second glyph;
   wherein, responsive to determining that the pixel value is associated with the coloration, the first glyph is opaque in a first region corresponding to a second region that is uncolored in the second glyph.

2. The method of claim 1, wherein the coloration is associated with black.

3. The method of claim 1, wherein the uncolored areas and regions are associated with white.

4. The method of claim 1, wherein the first aggregate opaque area is associated with black.

5. The method of claim 1, wherein the second aggregate uncolored area is associated with white.

6. The method of claim 1, wherein the second aggregate uncolored area is associated with translucency.

7. The method of claim 1, wherein the first region is contained within a third region that is opaque.

8. The method of claim 1, further comprising superimposing the first glyph and the second glyph.

9. The method of claim 8, further comprising illuminating the superimposed first and second glyphs from behind.

* * * * *